(12) United States Patent
Kato et al.

(10) Patent No.: US 9,386,292 B2
(45) Date of Patent: Jul. 5, 2016

(54) STEREOSCOPIC VIDEO PROCESSING APPARATUS AND STEREOSCOPIC VIDEO PROCESSING METHOD

(71) Applicant: Panasonic Corporation, Osaka (JP)

(72) Inventors: Yumiko Kato, Osaka (JP); Tsuyoshi Inoue, Nara (JP); Jun Ozawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 433 days.

(21) Appl. No.: 14/084,994

(22) Filed: Nov. 20, 2013

(65) Prior Publication Data

US 2014/0078252 A1 Mar. 20, 2014

Related U.S. Application Data

(63) Continuation of application No. PCT/JP2013/001355, filed on Mar. 5, 2013.

(30) Foreign Application Priority Data

Mar. 26, 2012 (JP) .................................. 2012-070291

(51) Int. Cl.
*H04N 13/00* (2006.01)
*H04N 13/04* (2006.01)

(52) U.S. Cl.
CPC ....... *H04N 13/0022* (2013.01); *H04N 13/0033* (2013.01); *H04N 13/0454* (2013.01); *H04N 13/0497* (2013.01)

(58) Field of Classification Search
CPC .......... H04N 13/0022; H04N 13/0033; H04N 13/0454; H04N 13/0497
See application file for complete search history.

(56) References Cited

U.S. PATENT DOCUMENTS

| 9,172,944 B2 | 10/2015 | Tajiri et al. | |
|---|---|---|---|
| 2011/0109731 A1* | 5/2011 | Koo | H04N 13/0022 348/51 |

(Continued)

FOREIGN PATENT DOCUMENTS

| CN | 102149001 | 8/2011 |
|---|---|---|
| CN | 102263967 | 11/2011 |

(Continued)

OTHER PUBLICATIONS

Office Action issued Jan. 26, 2016 in corresponding Chinese Patent Application No. 201380001416.9, with English translation of Search Report.

(Continued)

*Primary Examiner* — Mohammed Rahaman
(74) *Attorney, Agent, or Firm* — Wenderoth, Lind & Ponack, L.L.P.

(57) ABSTRACT

A stereoscopic video processing apparatus includes: a switch operation detection unit which detects a switch operation, made by a user, that is an operation to select a channel of a three-dimensional (3D) video or an operation for a fast-forward playback, a rewind playback, skipping, or locating a cue point of a 3D video; a frequency determination unit which determines a detection frequency indicating the number of switch operations per unit of time detected by the switch operation detection unit; and a video processing unit which performs processing to reduce a difference in depth between 3D videos before and after switching of the 3D videos when the detection frequency per unit of time determined by the frequency determination unit is higher than or equal to a predetermined frequency.

20 Claims, 17 Drawing Sheets

(56) References Cited

U.S. PATENT DOCUMENTS

| | | |
|---|---|---|
| 2011/0129144 A1 | 6/2011 | Takahashi et al. |
| 2011/0193945 A1 | 8/2011 | Tsuchida |
| 2011/0261160 A1 | 10/2011 | Tadokoro et al. |
| 2011/0292183 A1 | 12/2011 | Tajiri et al. |
| 2011/0310982 A1* | 12/2011 | Yang ............... H04N 13/0003 375/240.26 |
| 2012/0056990 A1 | 3/2012 | Yoshie |
| 2012/0092450 A1* | 4/2012 | Choi ................. H04N 13/004 348/43 |
| 2012/0293622 A1 | 11/2012 | Hyodo |
| 2013/0051659 A1 | 2/2013 | Yamamoto |
| 2015/0334366 A1 | 11/2015 | Tajiri et al. |

FOREIGN PATENT DOCUMENTS

| | | |
|---|---|---|
| JP | 2005-110121 | 4/2005 |
| JP | 2010-258723 | 11/2010 |
| JP | 2011-176541 | 9/2011 |
| JP | 2011-249859 | 12/2011 |
| JP | 2012-54877 | 3/2012 |
| WO | 2011/135760 | 11/2011 |

OTHER PUBLICATIONS

International Search Report issued May 28, 2013 in corresponding International Application No. PCT/JP2013/001355.

* cited by examiner

| Time interval (seconds) | |
|---|---|
| 2 | ← Channel change 2 |
| 3 | ← Channel change 3 |
| 2 | ← Channel change 4 |

190

| Time | Frame | Channel | Depth information Focus position (cm) |
|---|---|---|---|
| ⋮ | ⋮ | ⋮ | ⋮ |
| 00:23:04.381 | 83062 | 101 | 58 |
|  |  | 102 | 520 |
|  |  | 103 | 150 |
|  |  | ⋮ |  |
| 00:23:04.400 | 83063 | 101 | ⋮ |
|  |  | ⋮ |  |

| Time | Frame | Channel | Region | Depth information Focus position (cm) |
|---|---|---|---|---|
| ⋮ | ⋮ | ⋮ | ⋮ | ⋮ |
| 00:23:04.381 | 83062 | 101 | 11 | 301 |
| | | | 12 | 308 |
| | | | 13 | 311 |
| | | | 14 | 306 |
| | | | ⋮ | ⋮ |
| | | | 21 | 85 |
| | | | ⋮ | ⋮ |

| Time | Frame | Channel | Object ID | Depth information Focus position (cm) |
|---|---|---|---|---|
| ... | ... | ... | ... | ... |
| 00:23:04.381 | 83062 | 101 | 11 | 301 |
| | | | 12 | 308 |
| | | | 13 | 311 |
| | | | 14 | 306 |
| | | | 21 | 85 |
| | | | ... | ... |

190

//STEREOSCOPIC VIDEO PROCESSING APPARATUS AND STEREOSCOPIC VIDEO PROCESSING METHOD

CROSS REFERENCE TO RELATED APPLICATIONS

This is a continuation application of PCT International Application No. PCT/JP2013/001355 filed on Mar. 5, 2013, designating the United States of America, which is based on and claims priority of Japanese Patent Application No. 2012-070291 filed on Mar. 26, 2012. The entire disclosures of the above-identified applications, including the specifications, drawings and claims are incorporated herein by reference in their entirety.

FIELD

One or more exemplary embodiments disclosed herein relate generally to stereoscopic video processing apparatuses which output three-dimensional (3D) video.

BACKGROUND

When viewing 3D video, eyes move following depth changes of a subject in the 3D video.

Patent Literature (PTL) 1 discloses detecting a scene change in 3D video and allowing smooth depth transition at the time of the scene change.

PTL 2 discloses that when plural video content items are displayed on a multi-view screen, video content designated by a user is displayed in 3D while video content undesignated by a user is displayed in 2D.

CITATION LIST

Patent Literature

[PTL1] Japanese Unexamined Patent Application Publication No. 2010-258723
[PTL2] Japanese Unexamined Patent Application Publication No. 2011-249859

SUMMARY

Technical Problem

However, in the method disclosed by PTL 1, the smooth depth transition is not possible at the time of a scene change provided by a user's operation on 3D video (e.g., fast-forwarding, rewinding, and switching of programs).

Furthermore, a highly frequent repetition of a scene change through a repeated skipping playback or a zapping action by a user operation can impose a large load on the optical system of a user who is watching 3D video.

Also in the method of PTL 2, successive changes in a selected view on the multi-view screen lead to successive displaying of 3D video having different depths, which imposes a large load on the optical system of a user as in the case of zapping.

Thus, the conventional methods have a problem of eye fatigue caused by an increase in the load on the eyes of a user who is watching 3D video when a scene change occurs by a user operation.

The techniques disclosed herein have been developed in order to solve the above-stated problems, and one non-limiting and exemplary embodiment provides a stereoscopic video processing apparatus which prevents eye fatigue of users which is caused when a scene change occurs by a user operation.

Solution to Problem

In one general aspect, the techniques disclosed here feature a stereoscopic video processing apparatus comprising: a switch operation detection unit configured to detect a switch operation made by a user, the switch operation being an operation to select a channel of a three-dimensional (3D) video or an operation for a fast-forward playback, a rewind playback, skipping, or locating a cue point of the 3D video; a frequency determination unit configured to determine a detection frequency indicating the number of switch operations per unit of time detected by the switch operation detection unit; and a processing unit configured to perform processing to reduce a difference in depth between 3D videos before and after switching of the 3D videos when the detection frequency per unit of time determined by the frequency determination unit is higher than or equal to a predetermined frequency.

There general and specific aspects may be implemented using a system, a method, an integrated circuit, a computer program, or a recording medium, or any combination of systems, methods, integrated circuits, computer programs, or recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

With the stereoscopic video processing apparatus according to one or more exemplary embodiments or features disclosed herein, it is possible to prevent the eye fatigue of a user which is caused when a scene change occurs by a user operation.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 15A shows an example of information which is accumulated in the depth information accumulation unit.

DESCRIPTION OF EMBODIMENTS

Figure 1:
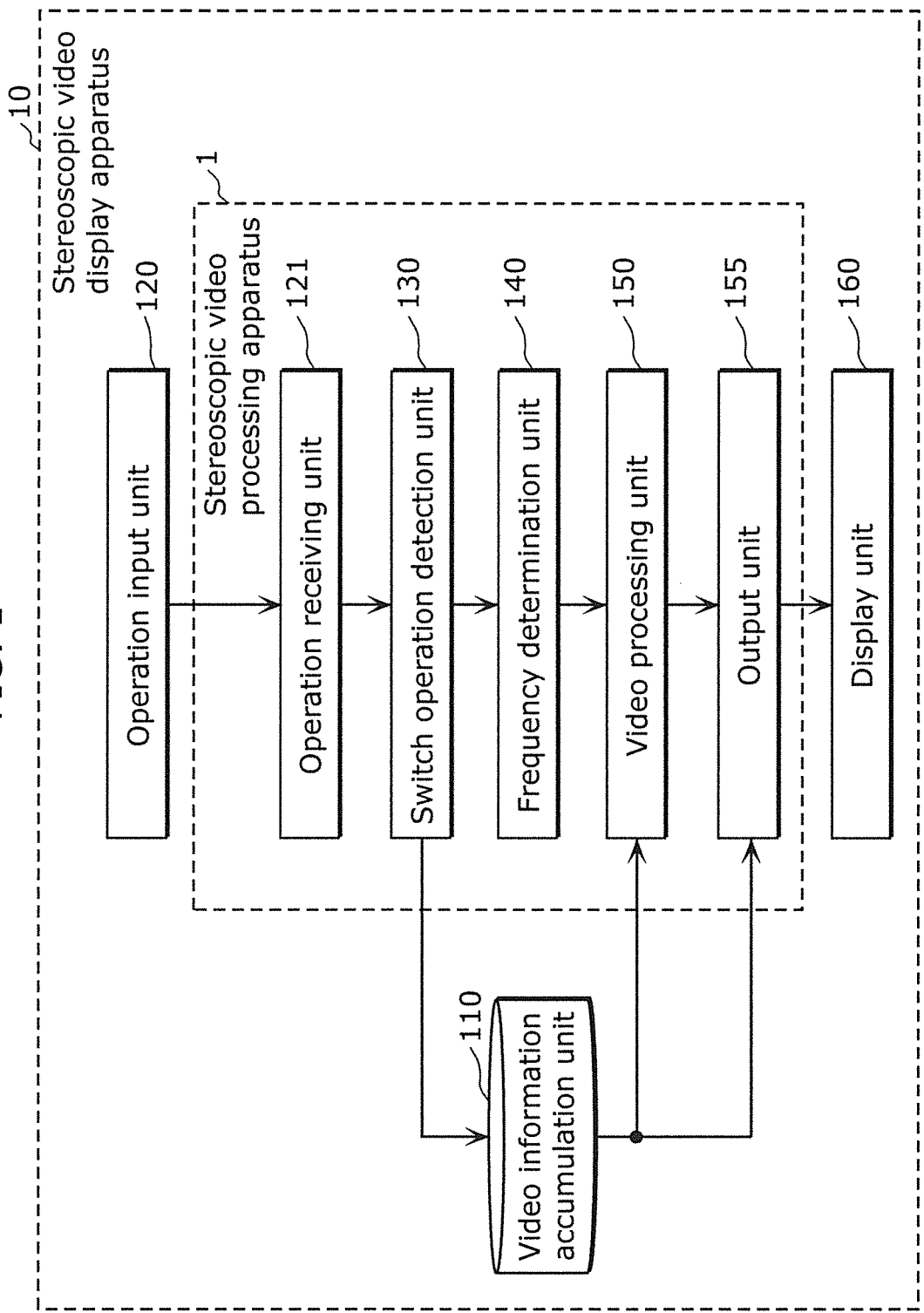
FIG. 1 is a block diagram showing an example of a structure of a stereoscopic video display apparatus according to Embodiment 1.

According to an exemplary embodiment disclosed herein, a stereoscopic video processing apparatus comprises: a switch operation detection unit configured to detect a switch operation made by a user, the switch operation being an operation to select a channel of a three-dimensional (3D) video or an operation for a fast-forward playback, a rewind playback, skipping, or locating a cue point of the 3D video; a frequency determination unit configured to determine a detection frequency indicating the number of switch operations per unit of time detected by the switch operation detection unit; and a processing unit configured to perform processing to reduce a difference in depth between 3D videos before and after switching of the 3D videos when the detection frequency per unit of time determined by the frequency determination unit is higher than or equal to a predetermined frequency.

With this structure, it is possible to reduce the difference in depth between 3D videos when the 3D video changes frequently by switch operations made by a user. Accordingly, even when the 3D video changes frequently, an excessive eye movement to follow the changes in depth is prevented. Thus, it is possible to prevent eye fatigue of users which is caused when a change in 3D video (a scene change) occurs by a user operation.

For example, the processing unit may be configured to reduce the difference in depth by performing processing on video information of the 3D video.

Specifically, the processing unit may be configured to reduce the difference in depth by performing, on the video information of the 3D video, processing to reduce a disparity between a left-eye video and a right-eye video.

Furthermore, the processing unit may be configured to present, to the user, one of a left-eye video and a right-eye video which are included in the 3D video.

Furthermore, it may be that the processing unit includes a shutter adjustment unit configured to place a right-eye shutter of a 3D video viewer worn by the user in an open state and a left-eye shutter of the 3D video viewer worn by the user in a closed state when a right-eye video included in the 3D video is presented, and place the right-eye shutter in the closed state and the left-eye shutter in the open state when a left-eye video included in the 3D video is presented, and the shutter adjustment unit is further configured to, when the detection frequency per unit of time determined by the frequency determination unit is higher than or equal to the predetermined frequency, (i) place the right-eye shutter and the left-eye shutter in the open state when the right-eye video is presented, and place the right-eye shutter and the left-eye shutter in the closed state when the left-eye video is presented, or (ii) place the right-eye shutter and the left-eye shutter in the open state when the left-eye video is presented, and place the right-eye shutter and the left-eye shutter in the closed state when the right-eye video is presented.

Furthermore, it may be that the above-stated stereoscopic video processing apparatus comprises a depth information accumulation unit configured to accumulate depth information of the 3D video, and the processing unit includes: a depth adjustment determination unit configured to determine, by referring to the depth information accumulated in the depth information accumulation unit, whether or not the difference in depth between the 3D videos before and after the switching of the 3D videos caused by the switch operation is larger than or equal to a predetermined difference, when the detection frequency per unit of time determined by the frequency determination unit is higher than or equal to the predetermined frequency; and a depth adjustment unit configured to perform the processing to reduce the difference in depth when the depth adjustment determination unit determines that the difference in depth is larger than or equal to the predetermined difference.

With this structure, it is possible to perform the processing to reduce a difference in depth only when the difference in depth is larger than or equal to the predetermined difference. Therefore, the processing to reduce the difference in depth can be prevented from being performed unnecessarily in the case where there is no need to reduce the difference in depth, such as the case where the difference in depth between before and after the scene change is small. It is to be noted that the depth adjustment unit is implemented as a 2D rendering processing unit in an embodiment.

Furthermore, it may be that the depth information accumulation unit is configured to accumulate the depth information for each of display regions obtained by spatially dividing a display screen for the 3D video, the depth adjustment determination unit is configured to determine for each of the display regions, by referring to the depth information accumulated for each of the display regions in the depth information accumulation unit, whether or not the difference in depth between the 3D videos before and after the switching of the 3D videos caused by the switch operation is larger than or equal to the predetermined difference, when the detection frequency per unit of time determined by the frequency determination unit is higher than or equal to the predetermined frequency, and the depth adjustment unit is configured to perform the processing to reduce the difference in depth when the depth adjustment determination unit determines for any of the display regions that the difference in depth is larger than or equal to the predetermined difference.

It can be presumed that a user keeps looking at almost the same position on the screen between before and after the scene change. Therefore, determining the difference in depth for each display region makes it possible to determine whether or not the depth at any position which a user keeps looking at changes. Thus, the processing to reduce a difference in depth can be performed only when needed.

Furthermore, the display screen for the 3D video may be divided into the display regions by dividing a central part of the display screen more finely than a peripheral part of the display screen.

It can be presumed that a user looks more at a central part of the screen than a peripheral part thereof. Therefore, partitioning the central part more finely makes it possible to more accurately determine whether or not the depth at the position which a user keeps looking at changes.

Furthermore, it may be that the depth information accumulation unit is configured to accumulate the depth information for a display region in a lower part of the display screen for the 3D video, the depth adjustment determination unit is configured to determine, by referring to the depth information accumulated for the display region in the lower part in the depth information accumulation unit, whether or not the difference in depth between the 3D videos before and after the switching of the 3D videos caused by the switch operation is larger than or equal to the predetermined difference, when the detection frequency per unit of time determined by the frequency determination unit is higher than or equal to the predetermined frequency, and the depth adjustment unit is configured to perform the processing to reduce the difference in depth when the depth adjustment determination unit determines for the display region in the lower part that the difference in depth is larger than or equal to the predetermined difference.

A user may switch channels while checking the button positions of a remote controller (hereinafter referred to as a remote). In such a case, a sight line of the user presumably moves back and forth between the remote and the lower half or its vicinity of the display screen. Therefore, this structure makes it possible to determine whether or not the depth changes in the lower half or its vicinity of the display screen. Thus, the processing to reduce a difference in depth can be performed only when needed.

Furthermore, it may be that the depth information accumulation unit is configured to accumulate the depth information for each of objects included in the 3D video, the depth adjustment determination unit is configured to determine for each pair of the objects, by referring to the depth information accumulated for each of the objects in the depth information accumulation unit, whether or not the difference in depth between the 3D videos before and after the switching of the 3D videos caused by the switch operation is larger than or equal to the predetermined difference, when the detection frequency per unit of time determined by the frequency determination unit is higher than or equal to the predetermined frequency, and the depth adjustment unit is configured to perform the processing to reduce the difference in depth when the depth adjustment determination unit determines for any pair of the objects that the difference in depth is larger than or equal to the predetermined difference.

Since the eyes of a user generally follow an object in 3D video, the eyes are considered to follow the object even between before and after a scene change. It is therefore possible to accurately determine whether or not the scene change imposes a load on the optical system of the user, by determining whether or not a change in depth occurs between the objects before and after the scene change.

Furthermore, it may be that the processing unit further includes a channel selection predicting unit configured to predict a channel which will be selected in the future, from a history of the operation to select a channel of the 3D video detected by the switch operation detection unit, and the depth adjustment determination unit is configured to determine whether or not a difference in depth between the 3D video in a channel currently selected and the 3D video in the channel predicted by the channel selection predicting unit to be selected in the future is larger than or equal to the predetermined difference, when the detection frequency per unit of time determined by the frequency determination unit is higher than or equal to the predetermined frequency.

With this structure, when the difference in depth is large between the 3D video in the currently selected channel and the 3D video in a channel which will probably be selected in the feature, it is possible to previously perform processing to reduce the difference in depth. Thus, when a user selects the predicted channel and thereby causes a scene change, the load to be imposed on the optical system of the user can be reduced.

Specifically, the channel selection predicting unit may be configured to predict the channel which will be selected in the future to be a channel with a next large number following the channel currently selected, when the history of the operation to select a channel of the 3D video detected by the switch operation detection unit allows to determine that channels are selected in ascending order.

By doing so, when the channels are selected in the ascending order, a channel that will be selected in the feature can be predicted.

Furthermore, the channel selection predicting unit may be configured to predict the channel which will be selected in the future to be a channel with a next small number following the channel currently selected, when the history of the operation to select a channel of the 3D video detected by the switch operation detection unit allows to determine that channels are selected in descending order.

By doing so, when the channels are selected in the descending order, a channel that will be selected in the feature can be predicted.

Furthermore, the operation to select a channel of the 3D video detected by the switch operation detection unit may be an operation to temporally switch the 3D videos and display the 3D videos in a same display region on a same display screen.

With this structure, the load imposed on the optical system of a user when a scene change occurs in the same display region on the same display screen which the user is watching can be reduced.

Furthermore, it may be that the above-stated stereoscopic video processing apparatus further comprise an output unit configured to output information to the user, and the output unit is configured to output a warning to the user when the detection frequency per unit of time determined by the frequency determination unit is higher than or equal to the predetermined frequency.

Furthermore, it may be that the above-stated stereoscopic video processing apparatus further comprises: an output unit configured to output information to the user; and an operation receiving unit configured to acquire operation input entered by the user, and the output unit is configured to output information for asking the user whether or not the processing to reduce the difference in depth is to be performed, when the detection frequency per unit of time determined by the frequency determination unit is higher than or equal to the predetermined frequency.

Furthermore, it may be that the above-stated stereoscopic video processing apparatus further comprises an output unit configured to output information to a second user different from a first user who made the switch operation, and the output unit is configured to output a warning to the second user when the detection frequency per unit of time determined by the frequency determination unit is higher than or equal to the predetermined frequency.

Furthermore, it may be that the above-stated stereoscopic video processing apparatus further comprises an operation receiving unit configured to acquire operation input entered by the second user, the output unit is configured to output, to the second user, the warning or information for asking whether or not the processing to reduce the difference in depth is to be performed, when the detection frequency per unit of time determined by the frequency determination unit is higher than or equal to the predetermined frequency, the operation receiving unit is configured to acquire the operation input entered by the second user, and the processing unit is configured to perform the processing to reduce the difference in depth according to the operation input entered by the second user and acquired by the operation receiving unit.

These general and specific aspects may be implemented using a system, a method, an integrated circuit, a computer program, or a recording medium, or any combination of systems, methods, integrated circuits, computer programs, or recording media.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

The stereoscopic video processing apparatuses according to exemplary embodiments are specifically described below with reference to the Drawings.

Embodiment 1

In this embodiment, a stereoscopic video processing apparatus for performing image processing is described which detects a user's switching operation between two or more 3D video items (which may also be hereinafter referred to simply as "videos") and reduces a difference in depth between the videos before and after the switching operation when the frequency of the switching operations is high. Here, in this embodiment, the user's switching operation between the two or more 3D videos indicates an operation to select a channel.

FIG. 1 shows a structure of a stereoscopic video display apparatus according to Embodiment 1.

A stereoscopic video display apparatus 10 includes a video information accumulation unit 110, an operation input unit 120, a stereoscopic video processing apparatus 1, and a display unit 160.

The video information accumulation unit 110 is a storage device which accumulates a plurality of 3D video information items (hereinafter referred to simply as "3D video") which are displayed on a screen.

The operation input unit 120 is a device for inputting a user operation and is, for example, a controller or a remote. The operation input unit 120 is connected to the stereoscopic video processing apparatus 1 in a wired or wireless manner.

According to the operation inputted by the user using the operation input unit 120, the stereoscopic video processing apparatus 1 obtains, from the video information accumulation unit 110, 3D video in a channel selected by the user, and outputs the obtained 3D video to the display unit 160.

The display unit 160 displays, on a screen (a display), the 3D video outputted from the stereoscopic video processing apparatus 1.

The stereoscopic video processing apparatus 1 includes an operation receiving unit 121, a switch operation detection unit 130, a frequency determination unit 140, a video processing unit 150 (which constitutes a processing unit), and an output unit 155.

The operation receiving unit 121 receives, from the operation input unit 120, operation information entered by the user who is watching the 3D video.

The switch operation detection unit 130 detects, based on the operation information received by the operation receiving unit 121 from the operation input unit 120, an operation that the user switches the video from one to another (hereinafter referred to as "a switch operation"). Here, the switch operation detected by the switch operation detection unit 130 is an operation to temporally switch the 3D videos and display the 3D videos in the same display region on the same display screen.

The frequency determination unit 140 determines whether or not the frequency of video switch operations per unit of time is higher than or equal to a predetermined frequency.

The video processing unit 150 performs, based on a result of the determination by the frequency determination unit 140, depth adjustment processing on the 3D video accumulated in the video information accumulation unit 110.

The output unit 155 outputs, to the display unit 160, the video obtained by the video processing unit 150 performing the depth adjustment processing.

<Video Processing Based on Zapping Operation>

Figure 2:
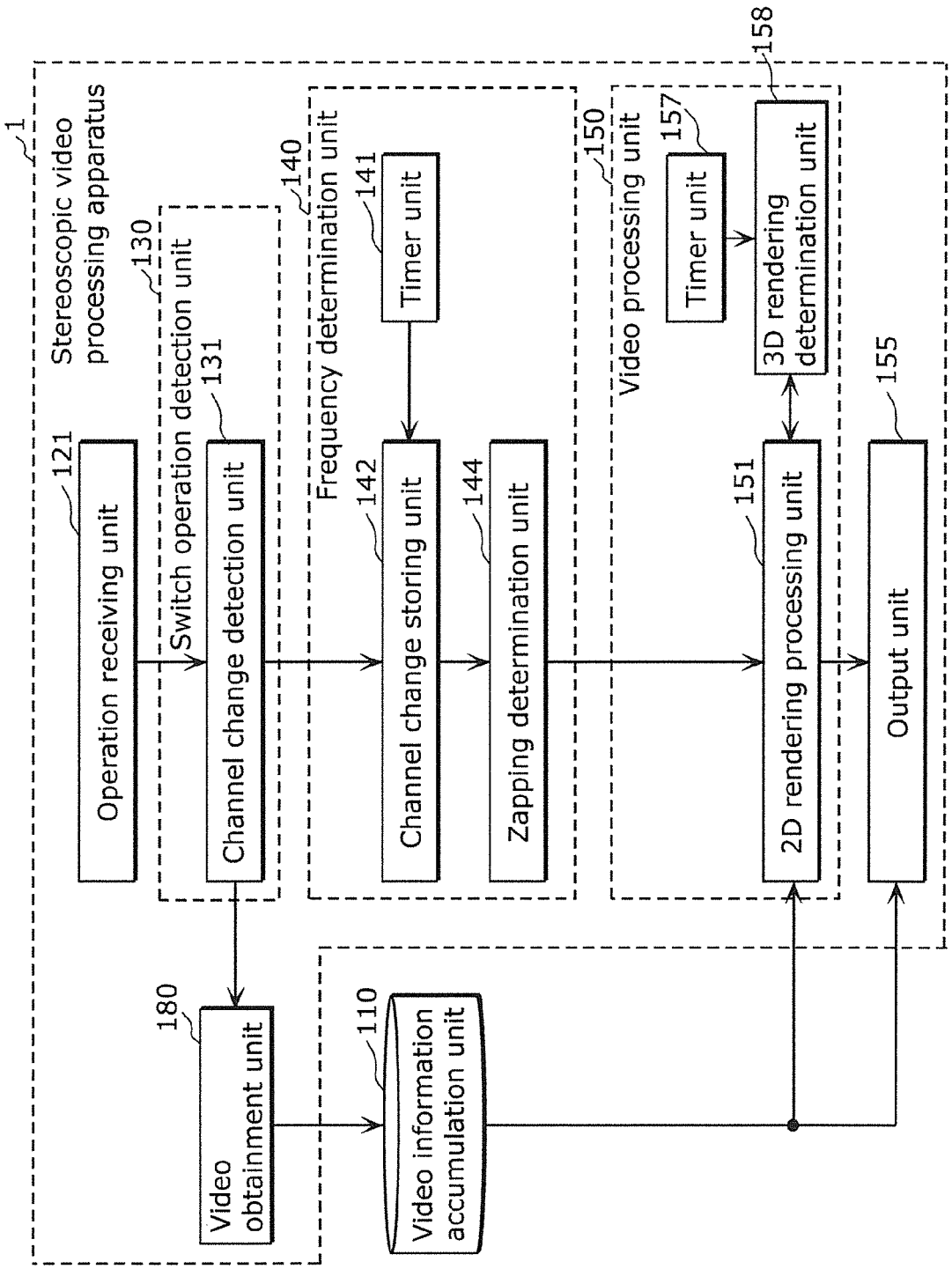
FIG. 2 is a block diagram showing an example of a detailed structure of the stereoscopic video processing apparatus according to Embodiment 1.

FIG. 2 shows a detailed structure of the stereoscopic video processing apparatus 1 according to Embodiment 1.

The switch operation on the 3D video in this embodiment is a zapping operation by which the channels of 3D videos displayed in the same region on the same screen are changed one after another.

The stereoscopic video processing apparatus 1 further includes a video obtainment unit 180. The switch operation detection unit 130 includes a channel change detection unit 131. The frequency determination unit 140 includes a timer unit 141, a channel change storing unit 142, and a zapping determination unit 144. The video processing unit 150 includes a 2D rendering processing unit 151, a timer unit 157, and a 3D rendering determination unit 158.

The channel change detection unit 131 detects a channel change operation based on the switch operation made by a user. The detected channel change operation indicates a fact that a channel change operation has been performed and a channel resulting from the operation, for example.

The timer unit 141 and the timer unit 157 each measure time.

Figures 3A, 3B:
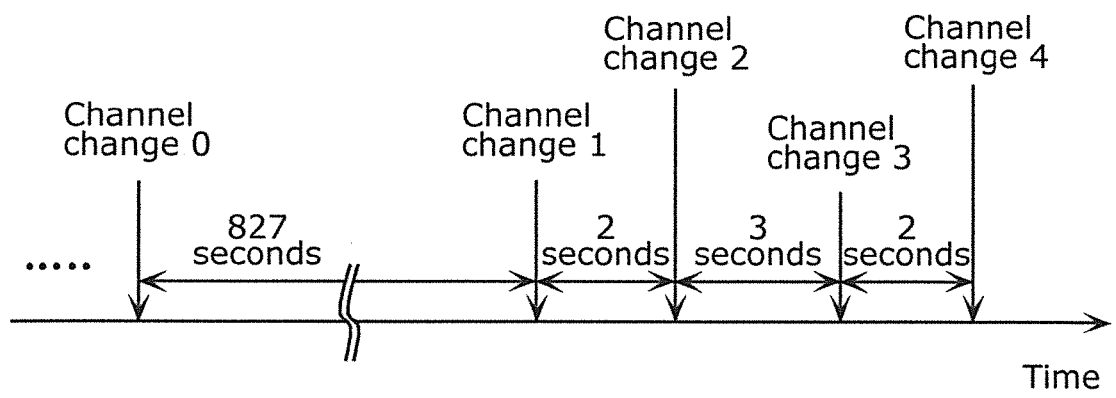
FIG. 3A shows an example of a structure of data stored in a channel change storing unit.
FIG. 3B is a schematic view for explaining time intervals.

The channel change storing unit 142 stores a time interval between the last channel change and a point in time when channel change information detected by the channel change detection unit 131 is detected. FIG. 3A shows an example of a structure of data stored in the channel change storing unit 142. FIG. 3B is a schematic view for explaining time intervals. The example of FIG. 3B shows that five channel changes occurred from channel change 0 to channel change 5. The last channel change for the channel change 1 is the channel change 0. The time interval between the point in time when the channel change 0 occurred and the point in time when the channel change 1 occurred is 827 seconds, for example. The last channel change for the channel change 2 is the channel change 1, and the channel change storing unit 142 stores two seconds as the time interval from the time point of the channel change 1 to the time point of the channel change 2. Likewise, the channel change storing unit 142 stores a time interval from the time point of the last channel change to the time point of each of the channel change 3 and the channel change 4. Every time the channel change detection unit 131 detects a channel change, the timer unit 141 starts measuring time to measure a time interval. In this embodiment, the upper limit of the number of data items which the channel change storing unit 142 stores is 3.

The zapping determination unit 144 determines, based on the number of channel changes per unit of time, whether or not the switch operation performed by the user is zapping.

The video obtainment unit 180 obtains, from outside (such as a broadcast and a reproduction device), the 3D video information on the channel designated according to the channel change operation detected by the channel change detection unit 131, and accumulates the 3D video information in the video information accumulation unit 110.

When the zapping determination unit 144 determines that the switch operation performed by the user is a zapping operation, the 2D rendering processing unit 151 performs 2D rendering processing to convert the 3D video information obtained by the video obtainment unit 180 into 2D video information.

The 3D rendering determination unit 158 makes a determination on a stoppage of the 2D rendering processing based on the time elapsed after the start of the 2D rendering processing.

The output unit 155 outputs the video information on which the 2D rendering processing has been performed by the 2D rendering processing unit 151.

It is to be noted that when the zapping determination unit 144 determines that the switch operation performed by the user is not a zapping operation, the output unit 155 outputs the 3D video accumulated in the video information accumulation unit 110.

The display unit 160 displays, on the screen, the video information obtained from the output nit 155.

It is to be noted that although the channel change storing unit 142 stores time intervals in this embodiment, it may be that the channel change storing unit 142 stores points in time when the channel change operations are detected, and the zapping determination unit 144 calculates time intervals from the points in time stored in the channel change storing unit 142.

Figure 4:
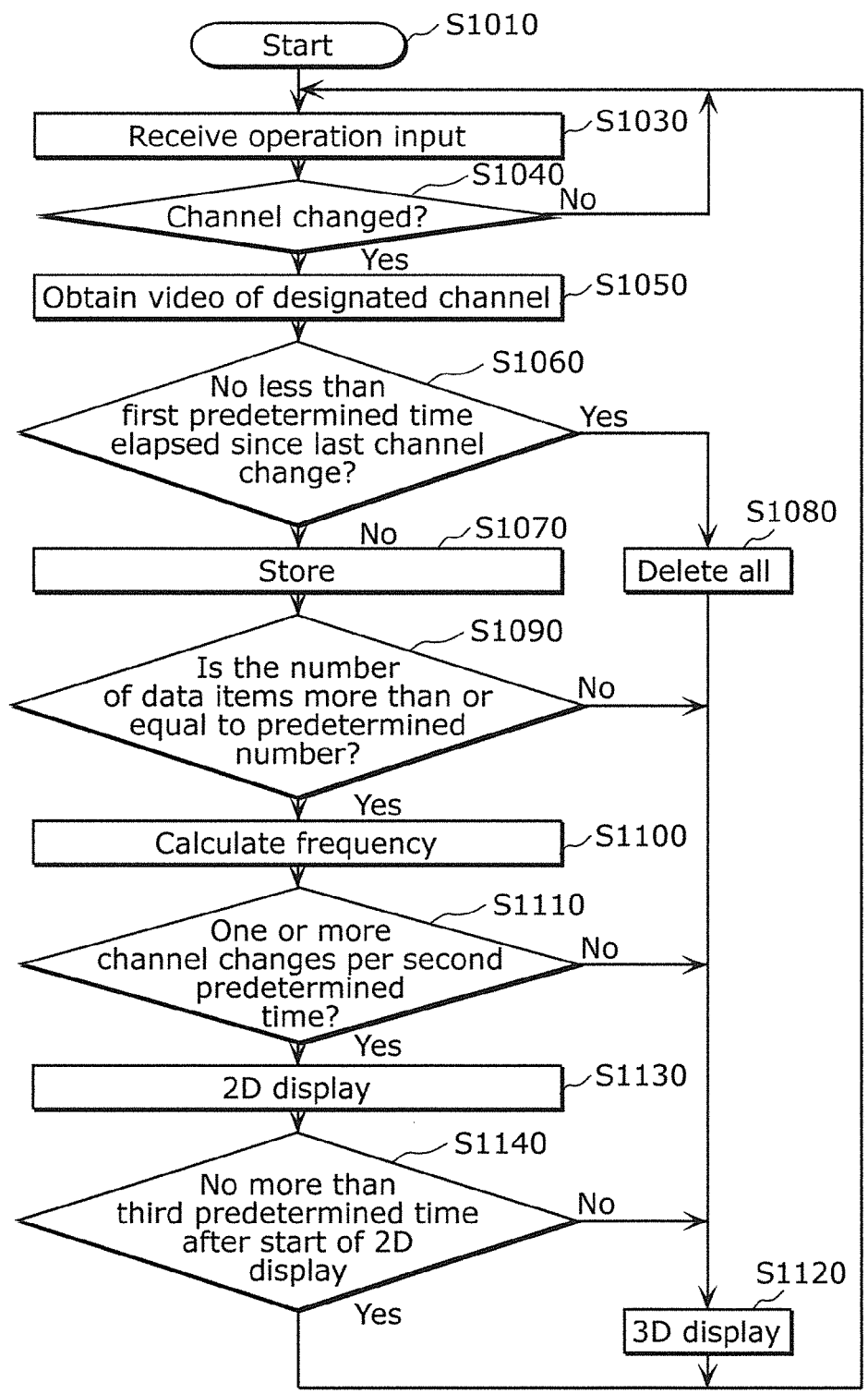
FIG. 4 is a flowchart showing an example of an operation of the stereoscopic video processing apparatus according to Embodiment 1.

FIG. 4 is a flowchart showing an operation of the stereoscopic video processing apparatus 1. With reference to FIG. 4, the processing procedure of the stereoscopic video processing apparatus 1 is described.

The stereoscopic video processing apparatus 1 starts to operate when the stereoscopic video display apparatus 10 including the stereoscopic video processing apparatus 1 is powered on (S1010).

The operation receiving unit 121 receives, from the operation input unit 120, the operation information inputted to the operation input unit 120 by the user who is watching the 3D video (S1030).

The channel change detection unit 131 determines whether or not the operation information received by the operation receiving unit 121 in Step S1030 indicates a channel change operation (S1040).

When the operation information received by the operation receiving unit 121 in Step S1030 indicates a channel change operation (Yes in S1040), the video obtainment unit 180 follows the received channel change operation to obtain, from outside, video in a channel designated by the channel change operation, and accumulates the video in the video information accumulation unit 110 (S1050).

When the operation information received by the operation receiving unit 121 in Step S1030 does not indicate a channel change operation (No in S1040), the processing returns to Step S1030.

The timer unit 141 determines whether or not a first predetermined time or more, for example, five seconds or more, have elapsed since the last channel change operation stored in the channel change storing unit 142 (S1060).

When the timer unit 141 determines that the first predetermined time or more has not elapsed since the last channel change operation (No in S1060), the channel change storing unit 142 stores the time interval between the last channel change operation and the current point in time (S1070). For example, as shown in FIG. 3B, the time intervals between the channel change operations from the channel change 2 to the channel change 4 are stored into the channel change storing unit 142. In this embodiment, the upper limit of the number of data items which the channel change storing unit 142 stores is 3. Therefore, the channel change storing unit 142 has already stored three data items, the oldest data is deleted so that the current time interval is stored. When the number of data items stored in the channel change storing unit 142 is less than three, the current time interval is stored in addition to the stored data items.

When the timer unit 141 determines that the first predetermined time or more has elapsed since the last channel change operation (Yes in S1060), the channel change storing unit 142 deletes the entire data of the channel change operations stored therein (S1080).

After Step S1070, the zapping determination unit 144 determines whether or not no less than a predetermined number of time intervals, for example, three or more time intervals, between channel change operations have been stored in the channel change storing unit 142 (S1090).

When no less than the predetermined number of time intervals between channel change operations have been stored (Yes in S1090), the zapping determination unit 144 calculates a frequency of channel change operations per unit of time from the time intervals between channel change operations stored in the channel change storing unit 142 (S1100). In this embodiment, the frequency of channel change operations per unit of time is calculated using the average of time intervals between channel change operations, for example.

When no less than the predetermined number of time intervals between channel change operations have not been stored (No in S1090), the processing proceeds to Step S1120.

The zapping determination unit 144 determines whether or not the frequency of channel change operations calculated in Step S1100 is higher than or equal to a predetermined frequency. Here, the zapping determination unit 144 determines, as this determination, whether or not there is one or more channel change operations per second predetermined time (e.g., three seconds) (S1110).

When it is determined in Step S1110 that the frequency of channel change operations is higher than or equal to the predetermined frequency (Yes in Step S1110), the 2D rendering processing unit 151 performs the 2D rendering processing to convert the 3D video into a 2D video. This means that the 2D rendering processing unit 151 selects one of the right-eye video and left-eye video in the 3D video.

The output unit 155 outputs the selected video.

The display unit 160 displays the video accumulated in the video information accumulation unit 110, in a way that the selected video can be viewed by the both eyes of the user (S1130).

An operation of the display unit 160 is described later for each 3D video display system.

When it is determined in Step S1110 that the frequency of channel change operations is lower than the predetermined frequency (No in Step S1110), the processing proceeds to Step S1120.

In Step S1120, the 2D rendering processing unit 151 does not perform the 2D rendering processing, and the output unit 155 outputs the left-eye video and right-eye video in the 3D video accumulated in the video information accumulation unit 110. The display unit 160 displays the 3D video in a way that the videos for left and right eyes can be viewed by the respective eyes of the user (S1220).

The 3D rendering determination unit 158 refers to the duration of the 2D rendering processing measured by the timer unit 157 from the time when Step S1130 is performed, and determines whether or not the 2D rendering processing is to be stopped (Step S1140). The timer unit 157 starts counting time from 0 every time Step S1130 is performed. In other words, the timer unit 157 starts counting time from 0 every time a channel change operation is made. Therefore, in the case where the user keeps changing channels at the frequency higher than or equal to the predetermined frequency per unit of time, the 2D rendering processing continues. When the user lowers the frequency of changing channels per unit of time, that is, stops zapping, then the 2D rendering processing is stopped, and the video is displayed in 3D.

When the duration of the 2D rendering processing is less than or equal to a third predetermined time (e.g., five seconds) in Step S1140 (Yes in Step S1140), the processing proceeds to Step S1030. This means that the 2D rendering processing by the 2D rendering processing unit 151 continues further.

When the duration of the 2D rendering processing exceeds the third predetermined time (e.g., five seconds) in Step S1140 (No in Step S1140), the 2D rendering processing unit 151 stops the 2D rendering processing, and the processing proceeds to Step S1120.

After Step S1120 is performed, then the processing returns to Step S1030.

Figure 5:
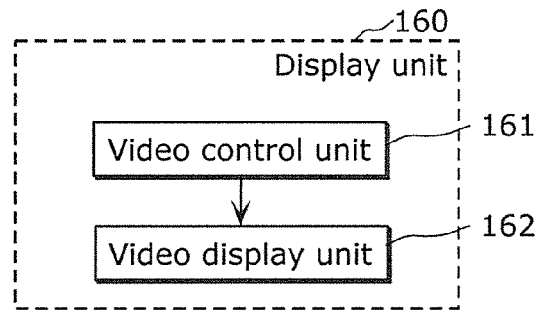
FIG. 5 is a diagram showing an example of a structure of a display unit which employs a glasses-free system as a 3D display system.

FIG. 5 shows an example of the structure of the display unit 160 which employs a glasses-free system as a 3D display system.

The glasses-free system uses a barrier provided on a surface of a display or uses special lenses to adjust light directions to the horizontal direction so that a right-eye video and a left-eye video are viewed by the right eye and the left eye, respectively, of a user who is watching the display.

The display unit 160 includes a video control unit 161 and a video display unit 162.

In the case where the display unit 160 employs the glasses-free display system and has a structure as shown in FIG. 5, the 2D rendering processing unit 151 firstly selects one of the right-eye video and the left-eye video in Step S1130.

Next, the 2D rendering processing unit 151 makes the left video and the right video in the 3D video accumulated in the video information accumulation unit 110 the same. For example, when the right-eye video is selected, the 2D rendering processing unit 151 firstly replaces the left-eye video with the right-eye video in the 3D video accumulated in the video information accumulation unit 110 to make the right-eye video and the left-eye video completely the same.

After performing the above 2D rendering processing, the 2D rendering processing unit 151 outputs completely the same right-eye video and left-eye video to the video control unit 161 in the display unit 160.

As in the case of 3D display, the video control unit 161 generates control signals for splitting the right-eye video into slits and displaying the slits at right-eye display positions and splitting the left-eye video into slits and displaying the slits at left-eye display positions.

Figure 6:
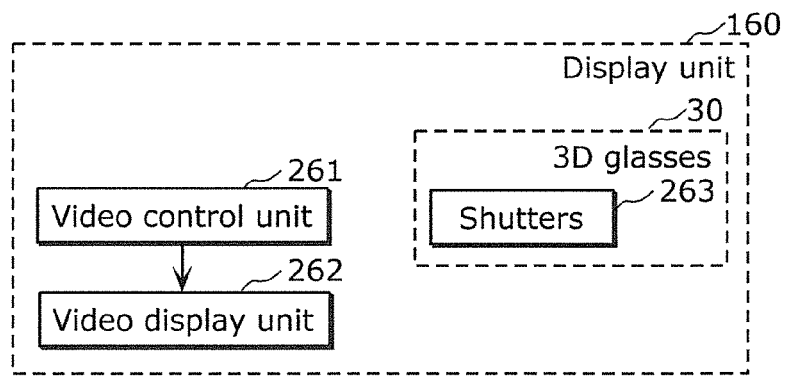
FIG. 6 is a diagram showing an example of a structure of a display unit which employs a passive-shutter system as the 3D display system.

According to the control signals outputted from the video control unit 161, the video display unit 162 displays the video processed by the 2D rendering processing unit 151 and outputted from the output unit 155. In short, the same video is displayed to the left and right eyes of the user, with the result that the user can watch the 2D video FIG. 6 shows an example of the structure of the display unit 160 which employs a passive-shutter system as the 3D display system.

In the passive-shutter system, a display is divided into right-eye and left-eye parts and on respective surfaces of these parts, polarization filters are provided which make different angles or directions for a right eye and a left eye. In addition, the video is viewed through special glasses with right-eye and left-eye polarization shutters adapted for the angles or directions given by the polarization filters on the display, which enables 3D display.

The display unit 160 includes a video control unit 261, a video display unit 262, and 3D glasses 30 (which constitute a 3D viewer), and the 3D glasses 30 include shutters 263.

In Step S1130, the 2D rendering processing unit 151 selects one of the right-eye video and the left-eye video. Among the right-eye video and the left-eye video in the 3D video accumulated in the video information accumulation unit 110, the video not selected is replaced with the video selected, to make the right-eye video and the left-eye video the same.

The 2D rendering processing unit 151 outputs, to the video control unit 261, the video in which the left video and the right video are the same. The video control unit 261 generates control signals for displaying, in a split manner, the left video and the right video on respective display regions for these videos as in the case of 3D display.

According to the control signals outputted from the video control unit 261, the video display unit 262 displays the video processed by the 2D rendering processing unit 151.

Through the shutters 263 of the worn 3D glasses 30, the user watches the video displayed on the video display unit 262. In short, the same video is displayed to the left and right eyes of the user, with the result that the user can watch the 2D video.

Figure 7:
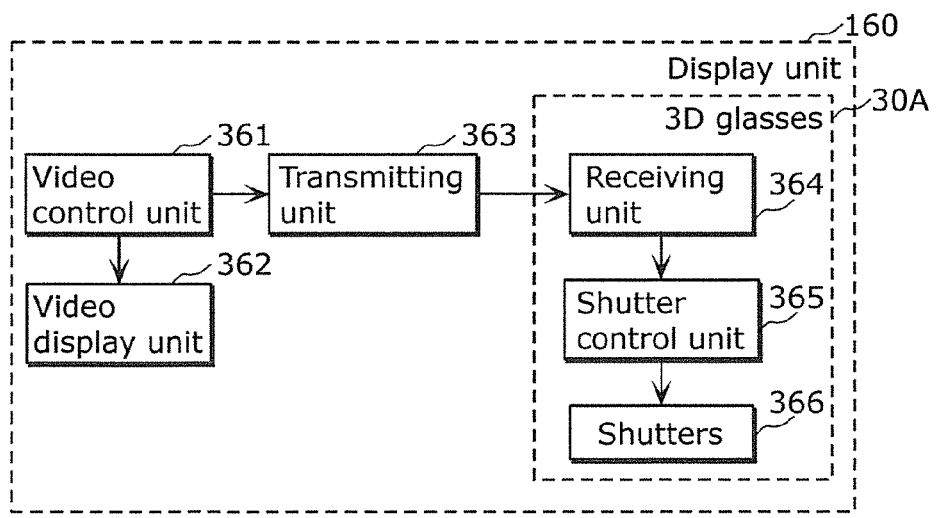
FIG. 7 is a diagram showing an example of a structure of a display unit which employs an active-shutter system as the 3D display system.

FIG. 7 shows an example of the structure of the display unit 160 which employs an active-shutter system as the 3D display system.

In the active-shutter system, the right-eye video and the left-eye video are alternately displayed on a display, and right and left shutters of special glasses are opened and closed in synchronization with the display timing. By doing so, the right-eye shutter is open when the right-eye video is displayed, so that the user looks at the display with the right eye. The left-eye shutter is open when the left-eye video is displayed, so that the user looks at the display with the left eye.

With the left video and the right video switched at a sufficiently high speed, the user can combine the left video and the right video, which achieves stereoscopic viewing.

As shown in FIG. 7, the display unit 160 includes a video control unit 361, a video display unit 362, a transmitting unit 363, and 3D glasses 30A. The video control unit 361 controls the timing of displaying the left and right videos and the timing of opening and closing the left and right shutters. The video display unit 362 displays the left and right videos under the control of the video control unit 361. The transmitting unit 363 transmits control signals (synchronization signals) from the video control unit 361 to the 3D glasses 30A.

The 3D glasses 30A include a receiving unit 364, a shutter control unit 365, and shutters 366. The receiving unit 364 receives the control signals transmitted by the transmitting unit 363. The shutter control unit 365 controls the shutters 366 as to when to open and close the shutters 366, based on the control signals received by the receiving unit 364.

In the case of such a structure, there are two ways to display the video rendered in 2D in Step S1130.

The first way is performing, just as in the glasses-free system or the passive-shutter system, the processing of video replacement by the 2D rendering processing unit 151 so that the left video and the right video in the 3D video accumulated in the video information accumulation unit 110 become the same, and displaying, in the same or like manner as 3D display, the left video and the right video which are the same.

The second way is only selecting, by the 2D rendering processing unit 151, which of the left video and the right video is to be displayed, and changing, by the video control unit 361, the timing of opening and closing the shutters 366 so that the selected video is viewed by both eyes.

In the first way, in Step S1130, the 2D rendering processing unit 151 selects one of the right-eye video and the left-eye video and replaces the video not selected with the video selected among the right-eye video and the left-eye video in the 3D video accumulated in the video information accumulation unit 110, to make the right-eye video and the left-eye video the same.

The 2D rendering processing unit 151 outputs, to the video control unit 361, the right-eye video and the left-eye video which have become the same. The video control unit 361 generates, as in the case of 3D display, control signals for displaying the left video and the right video alternately, and further generates synchronization signals for switching the left and right shutters 366 in synchronization with the display operation.

According to the control signals outputted from the video control unit 361, the video display unit 362 displays the video processed by the 2D rendering processing unit 151.

At the same time, the transmitting unit 363 transmits, to the 3D glasses 30A, the synchronization signals generated by the video control unit 361, and the receiving unit 364 in the 3D glasses 30A receives the synchronization signals.

The shutter control unit 365 controls the opening and closing of the shutters 366 according to the synchronization signals received by the receiving unit 364.

Since the 2D rendering processing unit 151 has made the left video and the right video the same, the user will view the same video with the right eye and the left eye in sequence, thus watching the 2D video.

In the second way, the 2D rendering processing unit 151 selects one of the right-eye video and the left-eye video in Step S1130.

Here, assume that the 2D rendering processing unit 151 selects the right-eye video, for example. The 2D rendering processing unit 151 outputs a selection result to the video control unit 361.

The video control unit 361 generates, as in the case of 3D display, control signals for displaying the left video and the right video alternately, and further generates synchronization signals for switching the left and right shutters in synchronization with the display operation so that both the right-eye shutter and the left-eye shutter are opened when the right-eye video is displayed and both the right-eye shutter and the left-eye shutter are closed when the left-eye video is displayed.

The video display unit 362 displays, as in the case of 3D display, the left video and the right video alternately, and the transmitting unit 363 transmits, to the receiving unit 364, the synchronization signals generated by the video control unit 361.

The receiving unit 364 outputs the received synchronization signals to the shutter control unit 365, and the shutter control unit 365 causes the shutters to open and close in synchronization based on the synchronization signals. By doing so, both the shutters of the 3D glasses 30A worn by a user are open only when the right-eye image is displayed, with the result that the user will watch the right-eye images only.

In this way, 3D videos are each converted into a 2D video and displayed in 2D when being subjected to zapping, which keeps such fatigue-inducing video from being displayed that has frequently changing depths because of frequent scene changes as a result of switch operations by a user, and thereby makes it possible to prevent the fatigue of users which is caused by the switch operations by the user.

In other words, it is possible to reduce the difference in depth between the 3D videos when the 3D video changes frequently by the switch operations made by the user. Accordingly, even when the 3D video changes frequently, an excessive eye movement to follow the changes in depth is prevented. Thus, it is possible to prevent eye fatigue of users which is caused when a change in 3D video (a scene change) occurs by a user operation.

Variation 1 of Embodiment 1

Although the depth adjustment processing (the 2D rendering processing) is not performed on the 3D video until at least four channel change operations are made per unit of time in Embodiment 1, this variation describes a stereoscopic video processing apparatus which is capable of performing the depth adjustment processing even when only two channel change operations are made.

Figure 8:
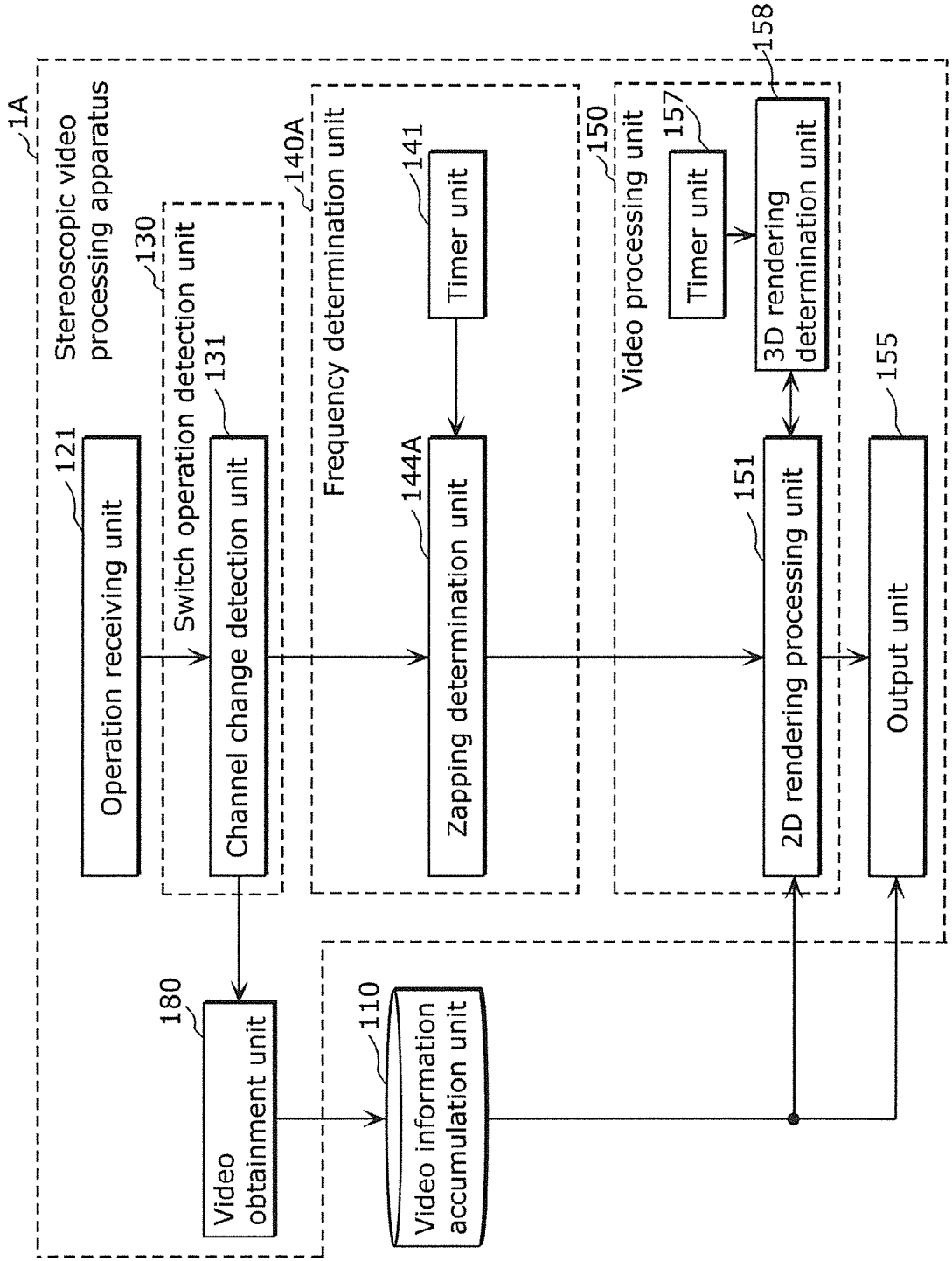
FIG. 8 is a block diagram showing a structure of a stereoscopic video processing apparatus according to Variation 1 of Embodiment 1.

FIG. 8 is a block diagram showing a structure of the stereoscopic video processing apparatus according to Variation 1 of Embodiment 1 which performs the depth adjustment processing even when only two channel change operations are made.

A stereoscopic video processing apparatus 1A according to this variation has the structure of the stereoscopic video processing apparatus 1 according to Embodiment 1 except a frequency determination unit 140A provided instead of the frequency determination unit 140. The frequency determination unit 140A has the structure of the frequency determination unit 140, but excludes the channel change storing unit 142 and includes a zapping determination unit 144A instead of the zapping determination unit 144.

The zapping determination unit 144A determines that a channel change operation by a user is zapping when the first predetermined time or more, for example, five seconds or more, have not elapsed since the last channel change operation.

Figure 9:
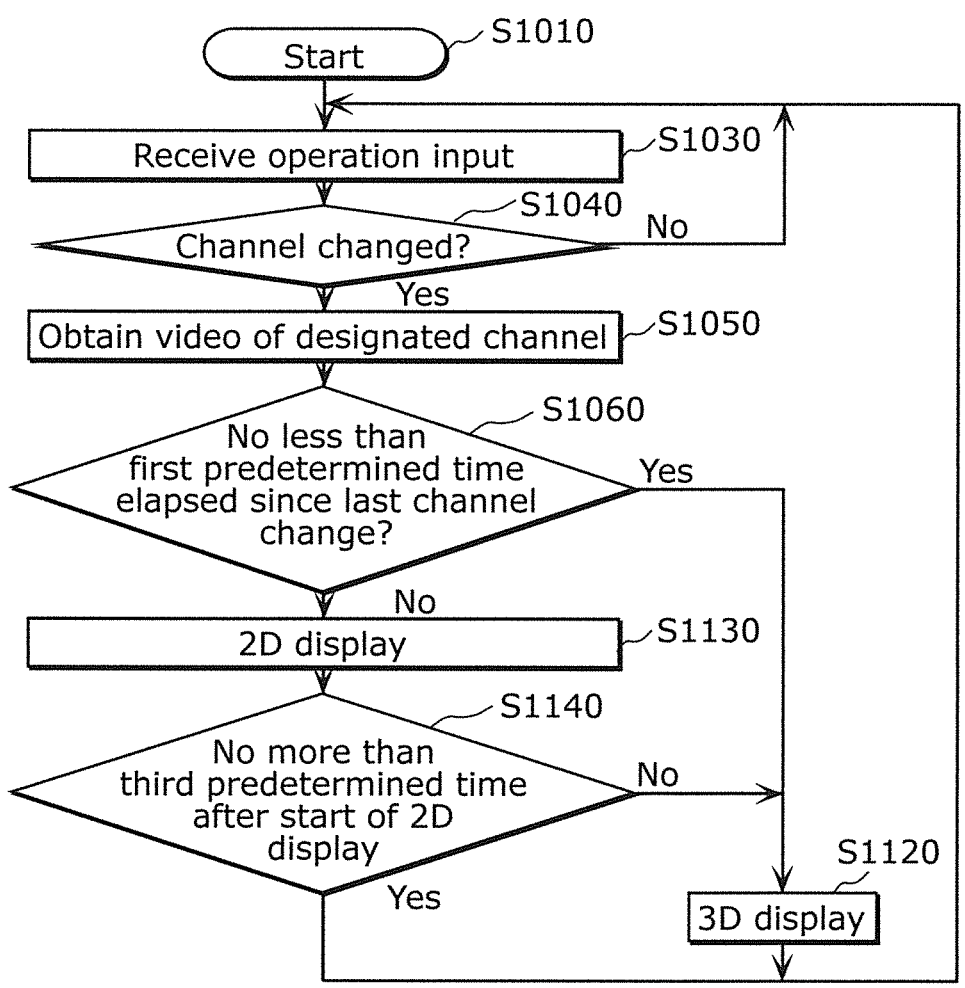
FIG. 9 is a flowchart showing an operation of a stereoscopic video processing apparatus.

FIG. 9 is a flowchart showing an operation of the stereoscopic video processing apparatus 1A.

This flowchart is the same as the flowchart for the stereoscopic video processing apparatus 1 according to Embodiment 1, shown in FIG. 4, except that Steps S1070 to S1110 are excluded. The following describes differences from Embodiment 1.

The zapping determination unit 144A determines whether or not the time interval measured by the timer unit 141 between the last channel change operation and the currently detected channel change operation is the first predetermined time or more, for example, five seconds or more (S1060). The zapping determination unit 144A determines that the channel change operation is zapping when the above time interval is less than five seconds.

When the time interval between the last channel change operation and the currently detected channel change operation is less than the first predetermined time, that is, when it is determined that the channel change operation is zapping (No in S1060), the 2D rendering processing unit 151 performs the processing to convert the 3D video to a 2D video, and the output unit 155 outputs the 2D video. The display unit 160 displays the video outputted from the output unit 155 (S1130).

When the time interval between the last channel change operation and the currently detected channel change operation is more than or equal to the first predetermined time, that is, when it is determined that the channel change operation is not zapping (Yes in S1060), the processing proceeds to Step S1120. In Step S1120, the 2D rendering processing unit 151 does not perform the 2D rendering processing, the output unit 155 outputs the 3D video accumulated in the video information accumulation unit 110, and the display unit 160 displays the 3D video (S1120).

Thus, in this variation, the frequency of channel change operations per unit of time is not calculated, and the depth adjustment processing is performed in all the cases where the channel change operation is made within the predetermined time since the last channel change operation. This allows a quicker response to zapping, leading to quicker removal of the load imposed on the optical system of a user by the scene changes.

Variation 2 of Embodiment 1

Although the 3D video is converted into a 2D video without consideration of the difference in depth between the videos before and after a channel switch when zapping is performed in Embodiment 1, the 3D video is converted into a 2D video only when the difference in depth is large in this variation.

Figure 10:
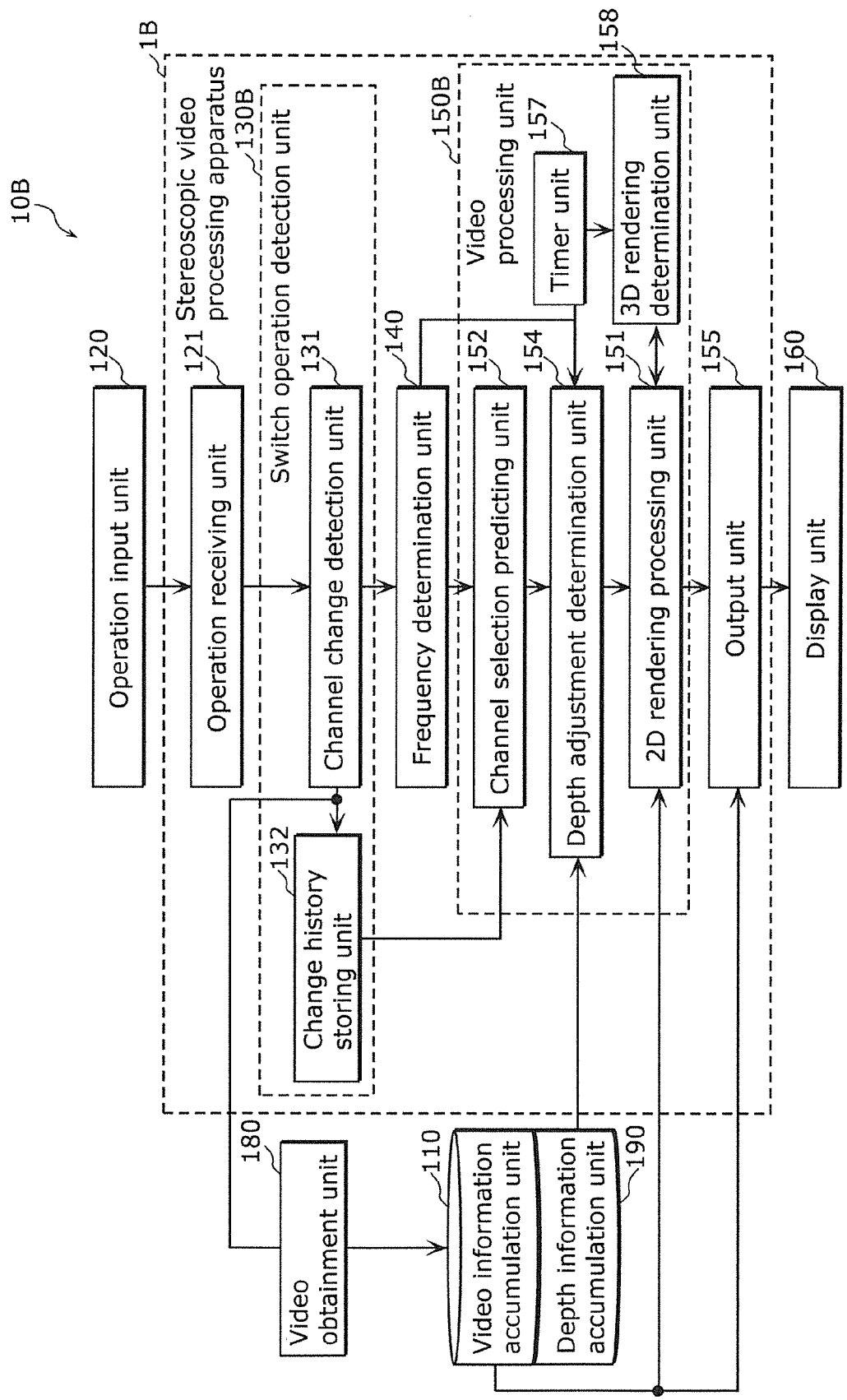
FIG. 10 is a block diagram showing an example of a structure of a stereoscopic video display apparatus according to Variation 2 of Embodiment 1.

FIG. 10 shows a structure of a stereoscopic video display apparatus according to this variation.

A stereoscopic video display apparatus 10B includes a stereoscopic video processing apparatus 1B, the video obtainment unit 180, the video information accumulation unit 110, a depth information accumulation unit 190, and the display unit 160.

The stereoscopic video processing apparatus 1B has the structure of the stereoscopic video processing apparatus 1 shown in FIGS. 1 and 2 except a switch operation detection unit 130B and a video processing unit 150B which are provided instead of the switch operation detection unit 130 and the video processing unit 150, respectively.

The switch operation detection unit 130B includes a channel change detection unit 131 and a change history storing unit 132. The video processing unit 150B includes a channel selection predicting unit 152, a depth adjustment determination unit 154, the 2D rendering processing unit 151, the timer unit 157, and the 3D rendering processing unit 158. Units in common with those in FIGS. 1 and 2 are denoted by the same numerals and descriptions thereof are omitted as appropriate.

The change history storing unit 132 stores a channel designated by the channel change operation detected by the channel change detection unit 131.

The channel selection predicting unit 152 predicts a channel which will be selected next by a user.

The depth adjustment determination unit 154 determines, based on the depth of the 3D video being currently displayed and the depth of the 3D video in the predicted channel, whether or not the depth adjustment is necessary.

It is to be noted that the video processing unit 150B may include a depth adjustment unit which makes a change in depth small in a method other than the conversion into a 2D video.

The depth information accumulation unit 190 is described below.

Figures 11A, 11B:
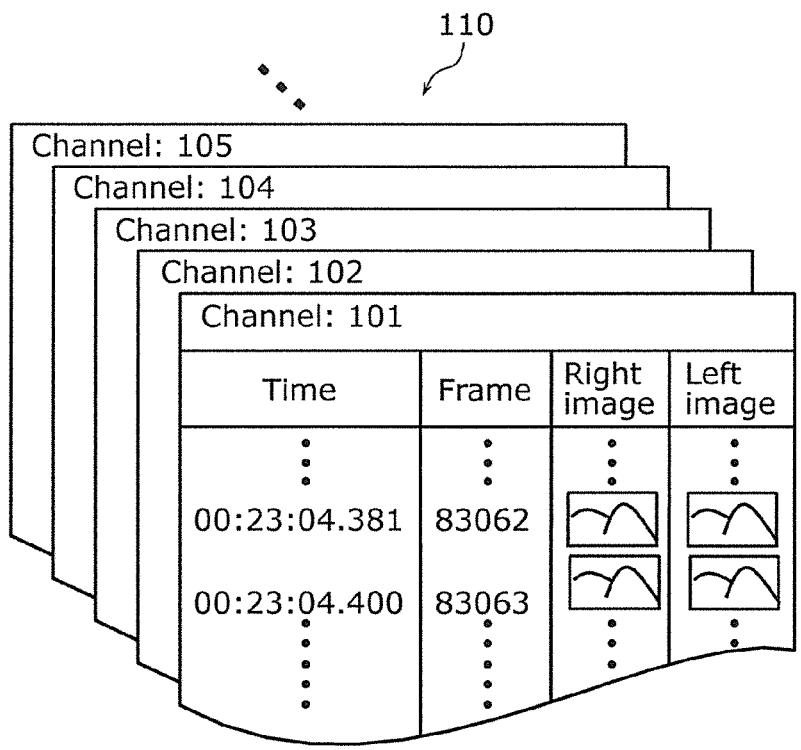
FIG. 11A shows an example of information which is accumulated in a video information accumulation unit.
FIG. 11B shows an example of information which is accumulated in a depth information accumulation unit.

FIG. 11A and FIG. 11B show an example of information which is accumulated in the video information accumulation unit 110 and an example of information which is accumulated in the depth information accumulation unit 190, respectively.

The video information accumulation unit 110 holds, for each channel, points in time, frames, data of right-eye and left-eye images of each of the frames. The right-eye image is an image included in the right-eye video, and the left-eye image is an image included in the left-eye video.

The depth information accumulation unit 190 holds, for each point in time (frame), an available channel and depth information of an image which is displayed on the channel. The depth information accumulation unit 190 holds, as the depth information, information of a focus position that is a depth position of a main object in an image. Here, the focus position is represented by a distance in centimeters on an axis extending in the depth direction from a standard watching position of users (for example, a position away from the plane of a screen by a distance three times the longitudinal length of the screen), which is assumed to be 0, toward the plane of the screen. As the depth information, distance information such as the mean depth in the image or the depth at the center of the screen may be used other than the focus distance. Moreover, information such as a disparity, that is, a distance between corresponding points in the left and right images, may be used as the depth information. Furthermore, information on eyeball movement of a user, such as a convergence angle of a user model at the standard watching position (assuming a user having a standard pupil-to-pupil distance), may be used as the depth information. It is to be noted that the depth information accumulated in the depth information accumulation unit 190 may be information obtained in advance from broadcast waves. The depth information recorded together with the 3D video on a recording medium such as Blu-ray Disc (registered trademark) may be accumulated in the depth information accumulation unit 190.

Figure 12:
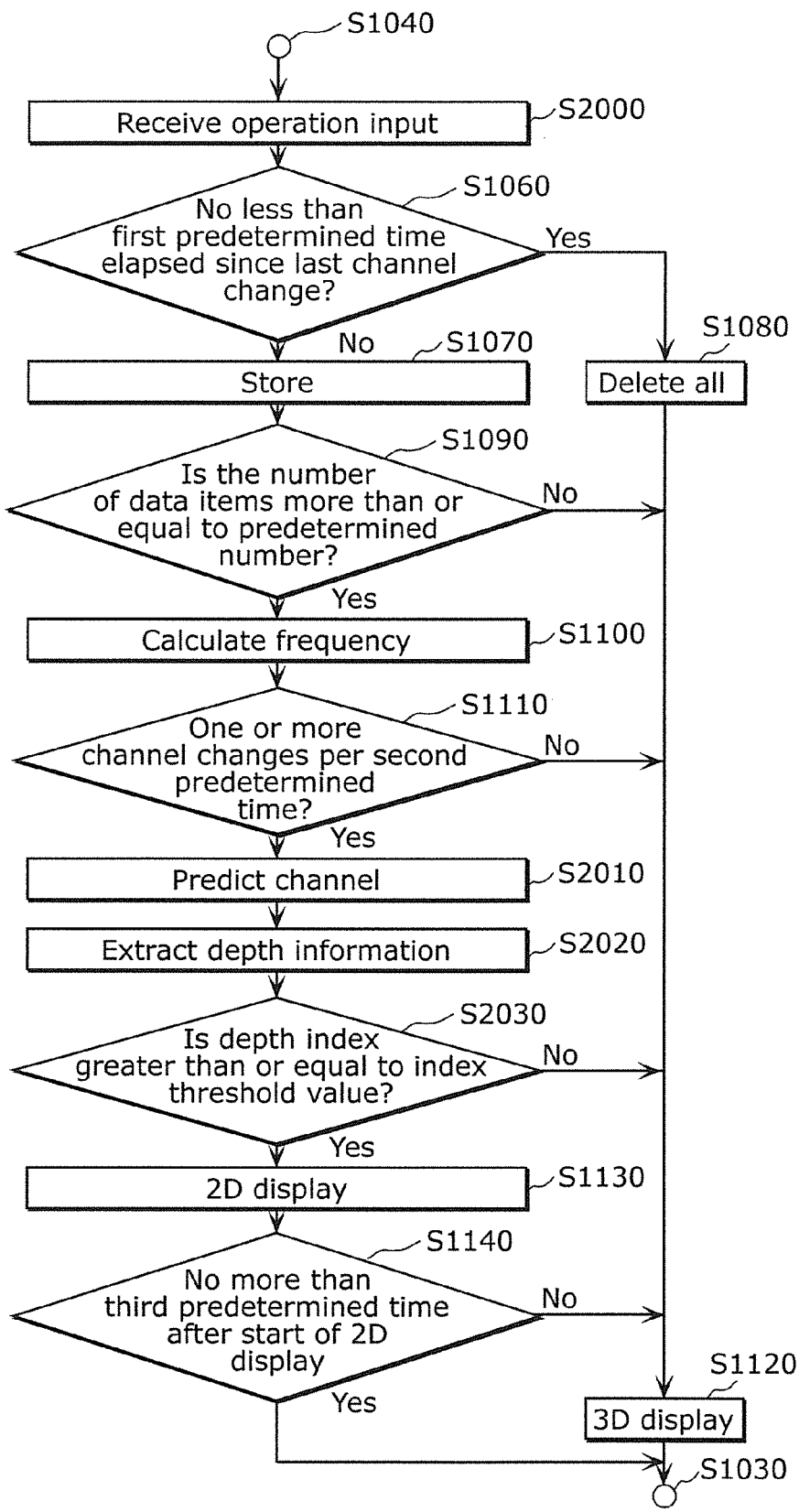
FIG. 12 is a flowchart showing a part of an operation of the stereoscopic video processing apparatus according to Variation 2 of Embodiment 1.

FIG. 12 is a flowchart showing a part of an operation of a stereoscopic video processing apparatus 1B according to this variation.

Steps S1010 to S1040 and S1120 to S1140 are the same as those in FIG. 4 in Embodiment 1 and therefore, descriptions thereof are omitted.

The operation of the stereoscopic video processing apparatus 1B is described below with reference to FIGS. 4 and 12.

When the input switch operation is a channel change operation in Step S1040 (Yes in S1040), the change history storing unit 132 stores the channel designated by the channel change operation (Step S2000).

When the input switch operation is not a channel change in Step S1040 (No in S1040), the processing returns to Step S1030.

After Step S2000, the timer unit 141 determines whether or not the first predetermined time or more has elapsed since the last channel change operation stored in the channel change storing unit 142 (S1060).

When the timer unit 141 determines that the first predetermined time or more has not elapsed since the last channel change operation (No in S1060), the channel change storing unit 142 stores the time interval between the last channel change operation and the current point in time (S1070).

When the timer unit 141 determines that the first predetermined time or more has elapsed since the last channel change operation (Yes in S1060), the channel change storing unit 142 deletes the entire data of the channel change operations stored therein (S1080).

After Step S1070, the zapping determination unit 144 determines whether or not no less than a predetermined number of time intervals, for example, three or more time intervals, between channel change operations have been stored in the channel change storing unit 142 (S1090).

When no less than the predetermined number of time intervals between channel change operations have been stored (Yes in 51090), the zapping determination unit 144 calculates a frequency of channel change operations per unit of time from the time intervals between channel change operations stored in the channel change storing unit 142 (S1100).

When no less than the predetermined number of time intervals between channel change operations have not been stored (No in S1090), the processing proceeds to Step S1120.

The zapping determination unit 144 determines whether or not the frequency of channel change operations calculated in Step S1100 is higher than or equal to a predetermined frequency. Here, the zapping determination unit 144 determines, as this determination, whether or not there is one or more channel change operations per second predetermined time (e.g., three seconds) (S1110).

When it is determined in Step S1110 that the frequency of channel change operations is higher than or equal to the predetermined frequency (Yes in Step S1110), the channel selection predicting unit 152 predicts a channel which will be selected next by a user, by referring to a channel change history stored in the channel change storing unit 142 (S2010).

Specifically, the channel selection predicting unit 152 determines whether the channels have been changed in ascending order or in descending order, and predicts the channel which will be selected next to be a channel with the next large number following the current channel when the channels have been changed in ascending order, and predicts the channel which will be selected next to be a channel with the next small number following the current channel when the channels have been changed in descending order. It is to be noted that when a button for changing the channels in descending order or a button for changing the channels in ascending order is pressed on the remote, it may be determined that the channels are changed in descending order or in ascending order, to predict the channel which will be selected next.

When the channel change history is not classified either as the ascending order or the descending order, the channel selection predicting unit 152 predicts the channel which will be selected next to be both the channel with the next large number following the current channel and the channel with the next small number following the current channel.

The depth adjustment determination unit 154 obtains, from the data accumulated in the depth information accumulation unit 190, first depth information that is depth information on the channel being currently displayed, second depth information that is depth information on the channel designated by the channel change operation stored in the channel history storing unit 132, and third depth information that is depth information on the channel predicted in Step S2010. The depth adjustment determination unit 154 calculates a depth index indicating a difference between the first depth information and the second depth information, and calculates a depth index indicating a difference between the second depth information and the third depth information (S2020).

For example, the first depth index indicating the difference between the first depth information and the second depth information is calculated by the following Expression 1, and the second depth index indicating the difference between the second depth information and the third depth information is calculated by the following Expression 2.

$$|L1-L2|/L1 \times L2 \quad \text{(Expression 1)}$$

$$|L2-L3|/L2 \times L3 \quad \text{(Expression 2)}$$

Here, L1 represents the first depth information, L2 represents the second depth information, and L3 represents the third depth information.

The depth adjustment determination unit 154 determines whether or not one of the calculated first and second depth indices is greater than or equal to a predetermined value, for example, 0.01 (S2030).

When one of the depth indices is greater than or equal to 0.01 (Yes in S2030), the depth adjustment determination unit 154 determines that the video is to be displayed in 2D, and the 2D rendering processing unit 151 selects one of the right-eye video and the left-eye video in the 3D video and controls the display unit 160 so that the video accumulated in the video information accumulation unit 110 is displayed in a manner that the selected video can be viewed by the both eyes of the user (S1130).

When both the depth indices are less than 0.01 in S2030 (No in S2030), the 2D rendering processing unit 151 does not perform the 2D rendering processing, and the display unit 160 displays, in 3D, the video accumulated in the video information accumulation unit 110 (S1120).

In this way, when zapping is performed on a plurality of 3D videos, the stereoscopic video processing apparatus 1B compares depths in respective channels, and when a change in depth caused by a channel change is large, converts the 3D video into a 2D video and displays the 2D video. As a result, when the videos having the same or close depths come successively at the time of zapping, it is possible to keep the 3D display so that the state of each program can be shown in a more comprehensible view to the user. On the other hand, when frequent scene changes by zapping cause frequent, drastic changes in depth, the depth adjustment is performed such that fatigue of a user due to the switch operation made by the user can be prevented.

In other words, this structure makes it possible to perform processing to reduce the difference in depth in advance when a difference between the 3D video in a channel which will be selected in the future and the 3D video in the currently selected channel is large. Thus, when a user selects the predicted channel and thereby causes a scene change, the load imposed on the optical system of the user can be reduced.

It is to be noted that the channel selection predicting unit 152 is dispensable in the video processing unit 150 of FIG. 10. In this case, the depth adjustment determination unit 154 compares, for all selectable channels or all candidate video content items to be played back, the depth information of the video being currently displayed and the depth in each channel or the depth of a video such as video content. With even one difference in depth which is greater than or equal to a predetermined disparity, the depth adjustment determination unit 154 determines that the depth adjustment processing is to be performed, for example.

It is to be noted that the depth adjustment determination unit 154 uses the depths in the respective channels at the same point in time, accumulated in the depth information accumulation unit 190 as shown in FIG. 11B, to compare the depths in the respective channels, but it may also be possible to obtain depth information at a display point in time for each channel in accordance with differences in display time between the channels and compare pieces of the depth information.

It is to be noted that the video processing unit 150 uses, as a depth adjustment method, a method of converting the 3D video into a 2D video in Embodiment 1 and Variations 1 and 2 of Embodiment 1, but other methods may be used as long as a difference in depth can be reduced in such method.

An example of the method of reducing a difference in depth through video processing is adjusting a disparity between a right-eye video and a left-eye video. The method of adjusting a disparity includes a method of reducing the disparity between the right-eye video and the left-eye video in each video before and after switching of the 3D videos to make the video close to a 2D video and displaying a resultant video. Furthermore, it may also be possible to adjust depths of two videos so that the depth positions of an object located at the farthest front become the same when the videos are displayed.

Furthermore, the depth adjustment may be performed so that the mean depths become equal.

Furthermore, the depth adjustment may be performed so that the depths at the center of the screen become equal.

Furthermore, it may also be possible to make adjustments for aligning depth positions by shortening the depth of one of the two videos that has a larger depth.

Variation 3 of Embodiment 1

In Variation 2 of Embodiment 1, the depth adjustment determination unit 154 determines, based on the depth information accumulated in the depth information accumulation unit 190, whether or not the depth index is greater than or equal to 0.01, thereby determining whether or not the 2D rendering processing is to be performed.

In this variation, the depth information accumulation unit 190 further accumulates depth information of each region in each frame. The depth adjustment determination unit 154 is designed to compare pieces of the depth information on a per region basis.

Generally, in the case of quickly switching channels, the user is likely to look at the same position on the screen without making large viewpoint movements. Thus, for the user, it is necessary to compare pieces of the depth information in the same region on the screen between the videos before and after the switching.

Figures 13A, 13B:
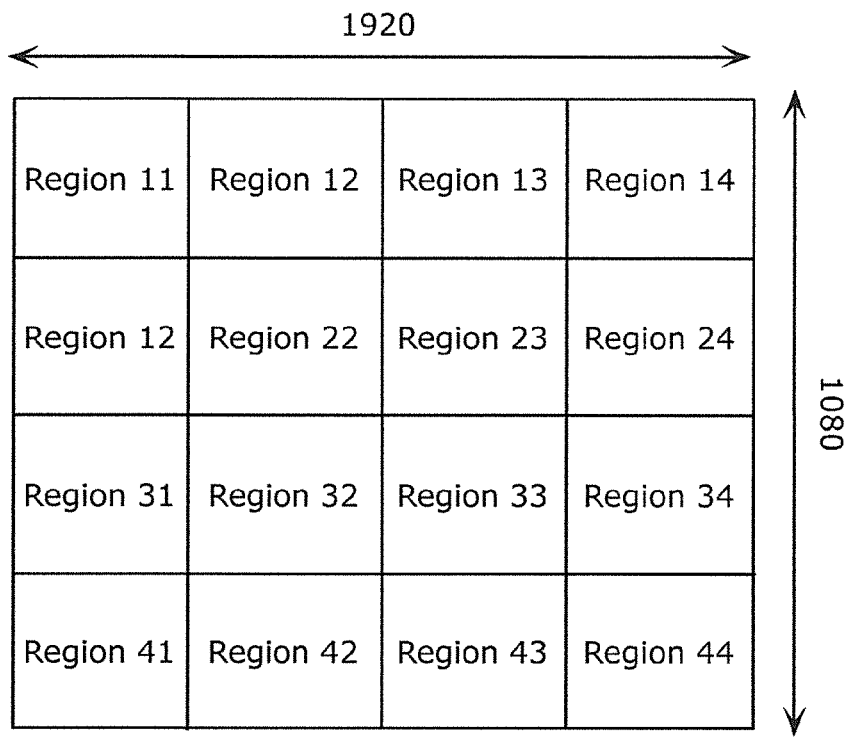
FIG. 13A shows a partition example of a screen.
FIG. 13B shows an example of information which is accumulated in the depth information accumulation unit.

In this variation, the screen is divided into 16 regions to form a grid pattern as shown in FIG. 13A, and the depth information accumulation unit 190 accumulates, as shown in FIG. 13B, the depth information for each of the regions resulting from the division.

The depth adjustment determination unit 154 compares, between channels, pieces of the depth information which belong to the same region. Specifically, the depth adjustment determination unit 154 determines, for each of the regions, whether or not a difference between the maximum value of depths in a channel and the maximum value of depths in another channel is greater than or equal to a predetermined value. When the difference in maximum value in any of the regions is greater than the predetermined value, the 2D rendering processing unit 151 performs the 2D processing because a viewer (a user) may have a visual perception with a feeling of strangeness.

A user is considered to keep looking at substantially the same position of the screen between before and after a scene change. Accordingly, determining a difference in depth on a per display region basis makes it possible to determine whether or not the depth at whatever position a user keeps looking at changes. Thus, the processing to reduce a difference in depth can be performed only when needed.

Figure 14:
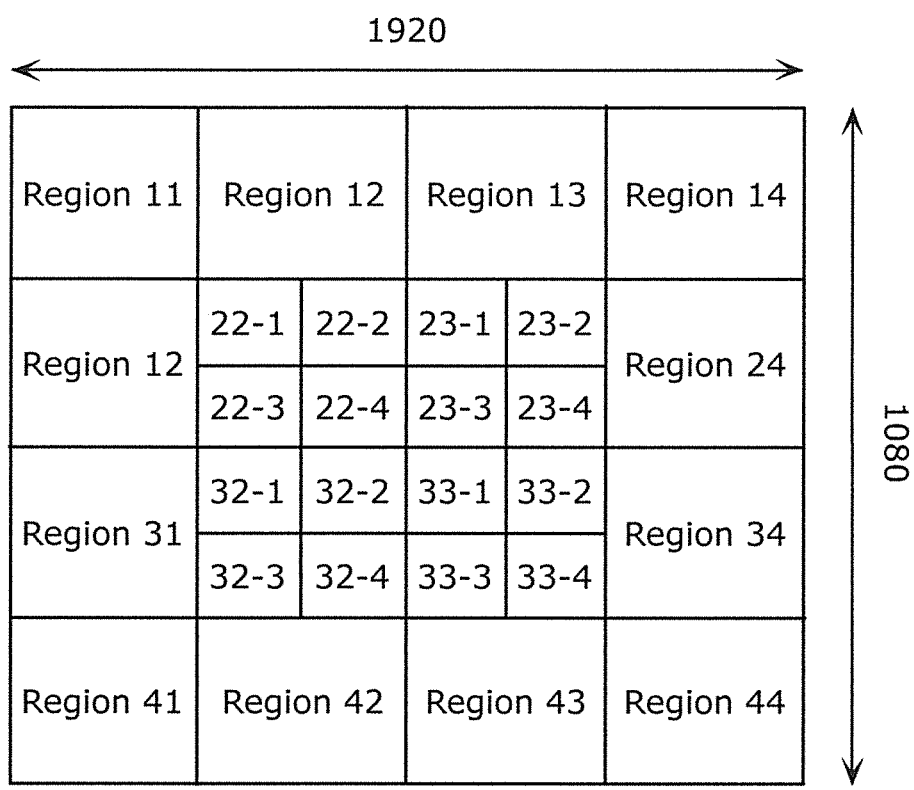
FIG. 14 shows a partition example of a screen.

It is to be noted that the regions resulting from the division are of the same area in FIG. 13A. However, a user focuses on a smaller area in a central part of the screen than in a peripheral part of the screen. Thus, the screen may be divided into regions for the depth information such that the number of regions in the central part of the screen is larger than in the peripheral part of the screen as shown in FIG. 14. This makes it possible to preferentially finely compare pieces of the depth information for the region which tends to draw the attention of the user. In other words, dividing the central part more finely makes it possible to more accurately determine whether or not the depth at the position which a user keeps looking at changes.

Figure 15B:
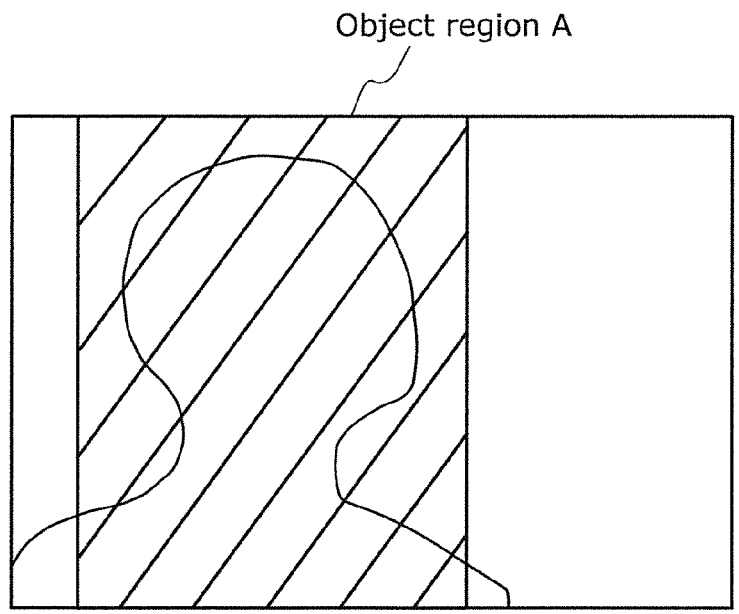
FIG. 15B shows an example of an object region.
Figure 15C:
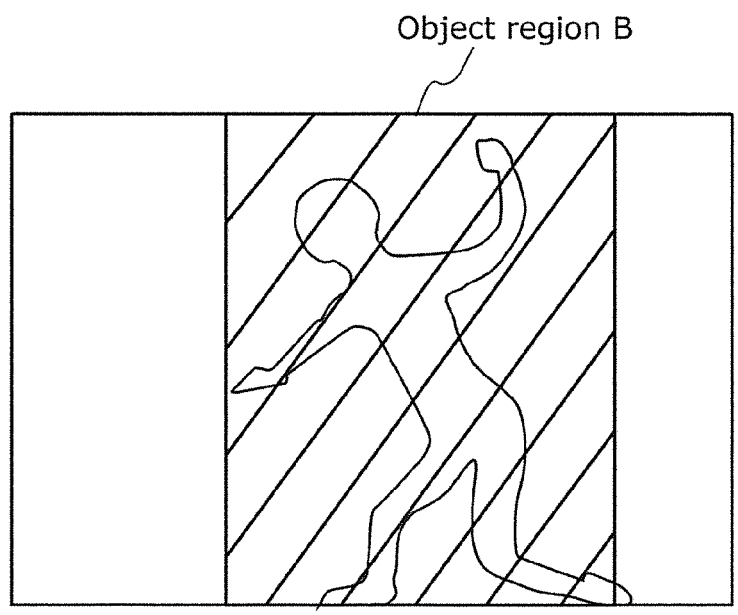
FIG. 15C shows an example of the object region.

It is to be noted that although the screen is divided into regions, and pieces of the depth information in the same region are compared in this variation, it may also be that, in the case where the video includes an object, such as a person, a face, a car, and a window, on which a user can easily focus, pieces of the depth information in the region covered by the object are compared. For example, the depth information accumulation unit 190 may accumulate the depth information for each object as shown in FIG. 15A. The depth adjustment determination unit 154 may be configured to compare pieces of the depth information obtained by extracting the depth information for each object in an object region A that is a region including an object displayed on the screen in the currently selected channel as shown in FIG. 15B and an object region B that is a region including an object displayed on the screen in the channel selected next. Alternatively, it may be that the depth adjustment determination unit 154 identifies each of the object region A and the object region B, obtains the depth information of the object region from the depth information accumulated, as shown in FIG. 13B, for each region resulting from the division, and compares pieces of the depth information. Thus, adjusting the depth of the object on which a user focuses allows a reduction in the load which is to be imposed on the optical system of the user by a scene change.

In other words, eyes of a user are generally considered to follow an object in the 3D video and therefore follow the object even in the videos before and after a scene change. Therefore, determining whether or not the depth changes between the objects before and after a scene change makes it possible to accurately determine whether or not the scene change imposes a load on the optical system of the user.

Figure 16:
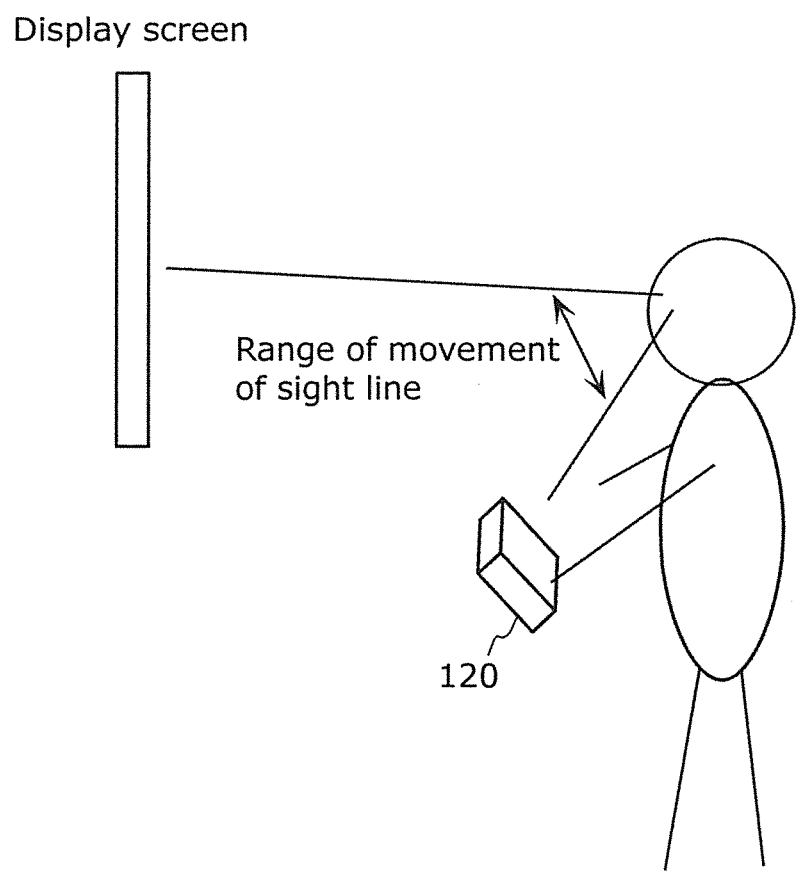
FIG. 16 shows an example of a range of movement of a sight line at the time of zapping.

It is to be noted that, in this variation, pieces of the depth information are compared on a per region basis. However, when performing zapping by selecting channels, a user often checks the button positions of a remote held in one's own hand and then switches channels as shown in FIG. 16. At this time, it is therefore important to compare pieces of the depth information for a lower part to the central part of the screen. Especially, when directly entering a channel number instead of the operation to increase or decrease the figure of the channel number at the time of switching channels with a remote, a sight line of the user moves to the remote once and then moves to the display screen. In this case, the sight line of the user often moves from the bottom toward the top of the display screen. Thus, as shown in this variation, in the case where the depth information is accumulated for each region, it may be that a region subject to the comparison is designated, and in the region, the comparison is made against the 3D information of the selected channel.

As above, there are cases where a user switches channels while checking the button positions of a remote. In such cases, a sight line of the user presumably moves back and forth between the remote and the lower half or its vicinity of the display screen. Therefore, this structure makes it possible to determine whether or not the depth changes in the lower half or its vicinity of the display screen. Thus, the processing to reduce a difference in depth can be performed only when needed.

Embodiment 2

In this embodiment, a stereoscopic video processing apparatus is described which detects a user's operation including a video skip operation, a video fast-forwarding operation, a video rewinding operation, and an operation to locate a video cut point at any time position in the same 3D video, and performs image processing to reduce a difference in depth between videos before and after a video switch action when the frequency of video switch actions caused by the user's operation is high.

Figure 17:
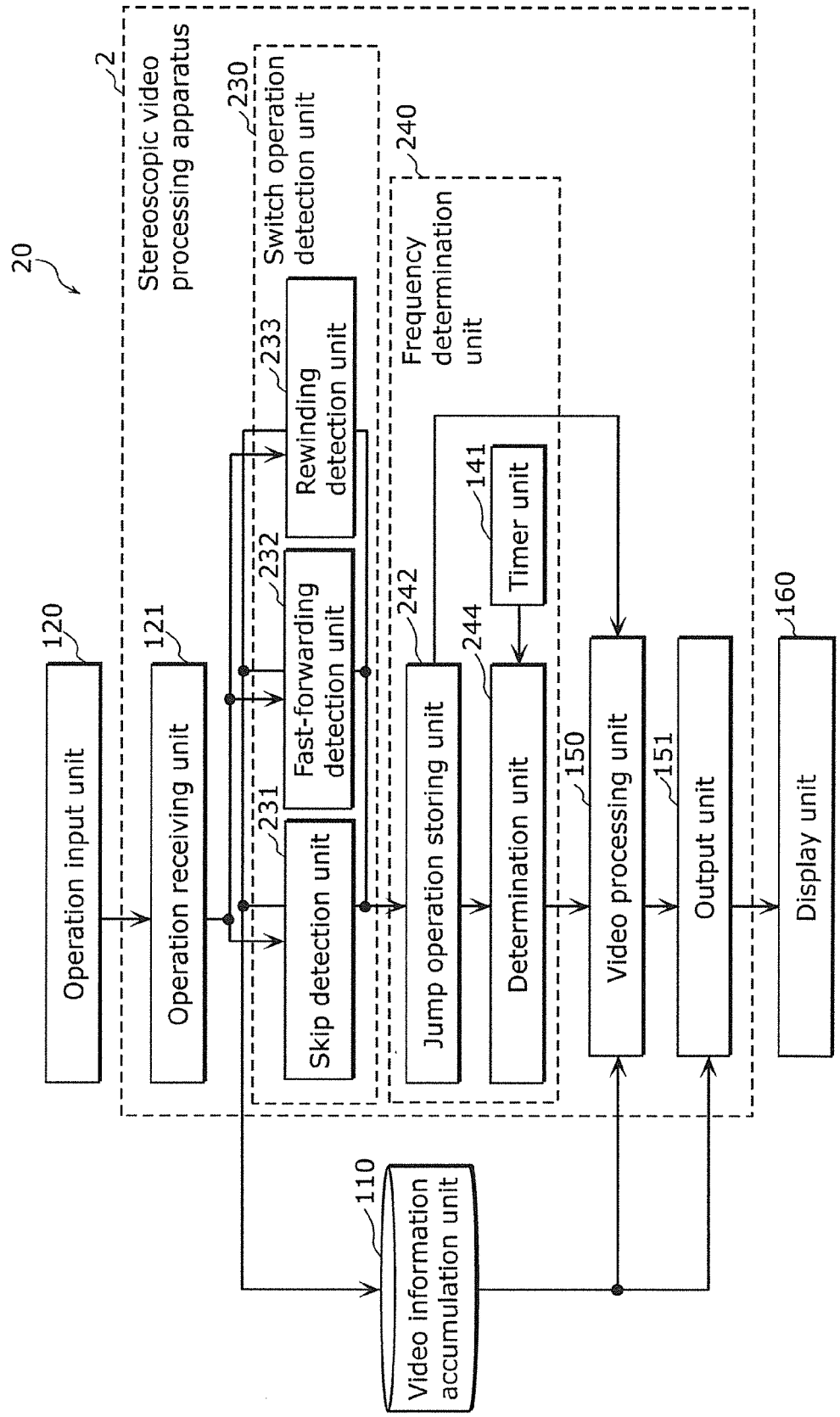
FIG. 17 is a block diagram showing an example of a structure of a stereoscopic video display apparatus according to Embodiment 2.

FIG. 17 shows a structure of a stereoscopic video display apparatus 20 according to Embodiment 2.

The stereoscopic video display apparatus 20 includes the video information accumulation unit 110, the operation input unit 120, a stereoscopic video processing apparatus 2, and the display unit 160.

The stereoscopic video processing apparatus 2 has the structure of the stereoscopic video processing apparatus 1 shown in FIGS. 1 and 2 except a switch operation detection unit 230 and a frequency determination unit 240 provided instead of the switch operation detection unit 130 and the frequency determination unit 140, respectively. Units in common with those in FIGS. 1 and 2 are denoted by the same numerals and descriptions thereof are omitted as appropriate.

The switch operation detection unit 230 includes at least one detection unit among a skip detection unit 231, a fast-forwarding detection unit 232, and a rewinding detection unit 233. A switch operation detected by the switch operation detection unit 230 is an operation to temporally switch the 3D videos and display the 3D videos in the same display region on the same display screen.

The skip detection unit 231 detects a skip operation in which a watching time position of one video is moved over a predetermined time interval and the video is displayed from the resultant watching time position. The skip operation indicates an operation to jump a watching time position to a position 30 seconds later and display the video from the resultant watching time position in order to skip a commercial message (CM), for example.

The fast-forwarding detection unit 232 detects a fast-forwarding operation in which one video is fast-forwarded to move a watching time position over an arbitrary time interval and the video is displayed from the resultant watching time position.

The rewinding detection unit 233 detects a rewinding operation in which one video is rewound to move a watching time position over an arbitrary time interval and the video is displayed from the resultant watching time position.

In this Embodiment 2, the skip operation, the fast-forwarding operation, the rewinding operation, and the cue point operation are collectively referred to as a jump operation.

The frequency determination unit 240 includes the timer unit 141, a jump operation storing unit 242, and a determination unit 244.

The timer unit 141 measures time.

The jump operation storing unit 242 accumulates a time interval between the jump operations.

The determination unit 244 determines, from the frequency of jump operations per unit of time, whether or not the frequency of scene changes caused by the jump operations by a user exceeds a predetermined value.

Figure 18:
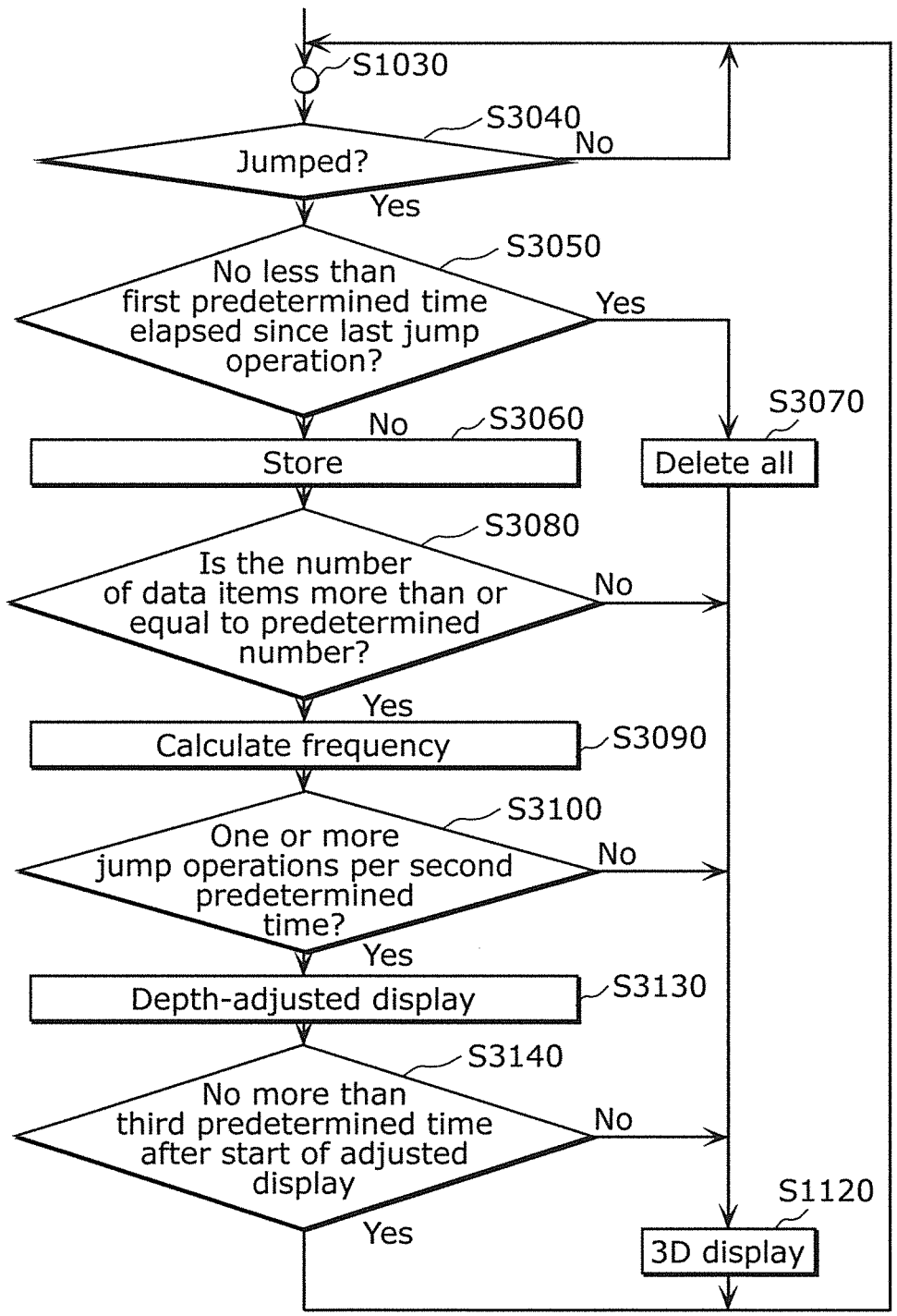
FIG. 18 is a flowchart showing a part of an operation of the stereoscopic video processing apparatus according to Embodiment 2.

FIG. 18 is a flowchart showing a part of an operation of the stereoscopic video processing apparatus 2 according to Embodiment 2.

Steps S1010 to S1030 are in common with those in FIG. 4 according to Embodiment 1 and therefore, descriptions thereof are omitted.

In Step S3040 following Step S1030, the switch operation detection unit 230 determines whether or not input of a switch operation, which corresponds to the jump operation, has been executed (S3040).

The determination on input of the jump operation is performed by the skip detection unit 231, the fast-forwarding detection unit 232, and the rewinding detection unit 233. Specifically, the skip detection unit 231 detects input of a skip operation in which a watching time position of a video is moved over a predetermined time interval and the video is displayed from the resultant watching time position. The fast-forwarding detection unit 232 detects input of an operation in which a video is fast-forwarded and then is displayed immediately thereafter. The rewinding detection unit 233 detects input of an operation in which a video is rewound and then is displayed immediately thereafter.

When any jump operation has been detected among the skip operation, the video display operation immediately after fast-forwarding, and the video display operation immediately after rewinding as above (Yes in S3040), the processing proceeds to Step S3050.

When the jump operation is not detected in Step S3040 (No in S3040), the processing returns to Step S1030.

The timer unit 141 determines whether or not the first predetermined time or more, for example, five seconds or more, have elapsed since the last jump operation stored in the jump operation storing unit 242 (S3050).

When the timer unit 141 determines that the first predetermined time or more has not elapsed since the last jump operation (No in Step S3050), the jump operation storing unit 242 stores the current jump operation and a point in time when the current jump operation is made (S3060).

When the timer unit 141 determines that the first predetermined time or more has elapsed since the last jump operation (Yes in Step S3050), the jump operation storing unit 242 deletes data related to all the jump operations stored therein and stores the current jump operation and a point in time when the jump operation obtained from the timer unit 141 is performed (S3070).

After Step S3060, the determination unit 244 checks whether or not data of no less than a predetermined number of jump operations, for example, three or more jump operations, has been stored in the jump operation storing unit 242 (S3080).

When data of no less than the predetermined number of jump operations has been stored (Yes in S3080), the determination unit 244 calculates a frequency of the jump operations per unit of time which have been stored in the jump operation storing unit 242 (S3090). The frequency per unit of time is calculated by determining a time interval between the earliest point in time and the latest point in time of the stored jump operations and then dividing the determined time interval by the number of stored jump operations, for example.

When data of no less than the predetermined number of jump operations has not been stored (No in S3080), the processing proceeds to Step S1120.

Furthermore, the determination unit 244 determines whether or not the frequency of the jump operations calculated in Step S3090 is higher than or equal to predetermined frequency. Here, as this determination, the determination unit 244 determines whether or not one or more jump operations have been performed per second predetermined time (e.g., three seconds) (S3100).

When it is determined in Step S3100 that the frequency of the jump operations is higher than or equal to the predetermined frequency (Yes in Step S3100), the video processing unit 150 performs processing to adjust depths of 3D videos, smooth the depths of the 3D videos which are displayed sequentially, and display the resultant 3D videos (S3130).

The processing to adjust depths is, for example, processing to adjust, by using the depths of an object located at the farthest front in the videos, a difference in depth between two videos so that the difference in depth falls within a disparity angle of 0.8 degrees.

When it is determined in Step S3100 that the frequency of the jump operations is lower than the predetermined frequency (No in Step S3100), the processing proceeds to Step S1120. In Step S1120, the video processing unit 150 does not perform the depth adjustment processing, and the display unit 160 displays, in 3D, the video accumulated in the video information accumulation unit 110 (S1120).

The video processing unit 150 refers to the duration of the depth adjustment processing starting from the time when Step S3130 is performed, and determines whether or not the depth adjustment processing is to be stopped (S3140). The operation in Step S3140 corresponds to the operation in Step S1140 in FIG. 4 according to Embodiment 1. When a user keeps performing the jump operations at the frequency higher than or equal to the predetermined frequency, the depth adjustment processing continues, and when the user stops making the jump operations, then the depth adjustment processing stops.

When the duration of the depth adjustment processing is less than or equal to the third predetermined time (e.g., five seconds) in Step S3140 (Yes in Step S3140), the processing proceeds to Step S1030.

When the duration of the depth adjustment processing exceeds the third predetermined time (e.g., five seconds) in Step S3140 (No in Step S3140), the video processing unit 150 stops the depth adjustment processing, and the processing proceeds to Step S1120.

With this structure, it is possible to reduce the difference in depth between 3D videos when the 3D video changes frequently by jump operations made by a user. Accordingly, even when the 3D video changes frequently, an excessive eye movement to follow the changes in depth is prevented. Thus, it is possible to prevent eye fatigue of users which is caused when a change in 3D video (a scene change) occurs by a user operation.

It is to be noted that although the depth adjustment processing is performed when the jump operations are made at the frequency higher than or equal to a predetermined frequency per unit of time in Embodiment 2, it may be that pieces of the depth information of the videos which are displayed sequentially are compared, and the depth adjustment processing is performed when a difference in depth is larger than or equal to a predetermined difference, as in the case of Variation 2 of Embodiment 1.

Furthermore, the switch operation detection unit 230 in Embodiment 2 may include a cue point operation detection unit. The cue point operation detection unit detects a cue point operation in which images are displayed from the start of a video or a position at which scenes included in the video are switched.

It is to be noted that although, as the video switching operation, zapping for changing channels is detected in Embodiment 1 and Variations 1 to 3 of Embodiment 1 and a jump operation for moving a time position within a video is detected in Embodiment 2, it may be that both the zapping and the jump operation are detected and when whichever operation is made sequentially and the frequency of the operations per unit of time is higher than or equal to a predetermined frequency, the depth adjustment processing is performed.

In the case where pressing a fast-forward button or a rewind button on a remote causes the video to be played back in fast-forward mode or in rewind mode, the depth adjustment processing may be performed at the point when the fast-forward button or the rewind button is pressed even once.

It is to be noted that each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the stereoscopic video processing method and so on according to each of the embodiments is a program causing a computer to execute the stereoscopic video processing method. This stereoscopic video processing method comprises: detecting a switch operation made by a user, the switch operation being an operation to select a channel of a three-dimensional (3D) video or an operation for a fast-forward playback, a rewind playback, skipping, or locating a cue point of the 3D video; determining a detection frequency indicating the number of switch operations per unit of time detected in the detecting; and performing processing to reduce a difference in depth between 3D videos before and after switching of the 3D videos when the detection frequency per unit of time determined in the determining is higher than or equal to a predetermined frequency.

It is to be noted that although the stereoscopic video processing apparatus performs the depth adjustment processing when the switch operations, which are zapping or jump operations, are performed sequentially and the operation frequency per unit of time is higher than or equal to the predetermined frequency in each of the above embodiments, it may be that an output unit which outputs a warning to a user is provided and when the switch operations are made at the frequency higher than or equal to the predetermined frequency per unit of time, the output unit outputs a warning to a user. The output unit may be a display unit which shows video or a sound output unit which outputs sound accompanied by video.

Furthermore, it may be that, when the switch operations are made at the frequency higher than or equal to a predetermined frequency per unit of time, a user may be asked whether or not processing to reduce a difference in depth is to be performed. In this case, the operation receiving unit 121 receives, from the operation input unit 120, operation information entered by the user in response to the inquiry.

Presenting a warning or an inquiry allows a user to be informed before the depth adjustment is performed that the depth adjustment is to be performed, with the result that the user will not be bewildered by the change in video.

It is to be noted that although the stereoscopic video processing apparatus performs the depth adjustment processing when the switch operations are made sequentially and the operation frequency per unit of time is higher than or equal to the predetermined frequency in each of the above embodiments, it may be that a second output unit which outputs information to a second user different from a first user who made the switch operations is provided and when the switch operations are made at the frequency higher than or equal to the predetermined frequency per unit of time, the second output unit outputs a warning to the second user. For example, the second output unit may output a warning by transmitting an e-mail to a mobile terminal of the second user.

Furthermore, it may be that the stereoscopic video processing apparatus includes a second operation receiving unit which receives operation input entered by a second user different from a first user who made the switch operations, and when first user makes the switch operations at the frequency higher than or equal to a predetermined frequency per unit of time, the second output unit outputs a warning to the second user or ask the second user whether or not processing to reduce a difference in depth is to be performed, and according to the operation input entered by the second user and received by the second operation receiving unit, the stereoscopic video processing apparatus performs the processing to reduce a difference in depth. For example, it may be that the second user inputs an operation on a mobile terminal, the mobile terminal transmits the operation input to the stereoscopic video processing apparatus, and then the second operation receiving unit receives the operation input.

When the stereoscopic video processing apparatus operates according to the operation input entered by the second user in response to the warning or inquiry presented to the second user, the second user can take a measure against an operation which imposes a high load on the eyes of the first user, to reduce the load on the eyes of the first user. For example, when the first user is a young child, an adult such as a parent can be the second user and reduce the load on the eyes of the young child.

The herein disclosed subject matter is to be considered description and illustrative only, the appended Claims are of a scope intended to cover and encompass not only the particular embodiments disclosed, but also equivalent structures, methods, and/or uses.

INDUSTRIAL APPLICABILITY

The stereoscopic video processing apparatus according to one or more exemplary embodiments disclosed herein is widely applicable to image display systems in which users watch 3D videos and are able to make operations such as a scene change. For example, the stereoscopic video processing apparatus is applicable to a television, a computer, or a game machine. Furthermore, the stereoscopic video processing apparatus is applicable to not only the devices for enabling users to watch video content, but also medical equipment such as diagnostic imaging devices and endoscopes, surgical or vehicle simulators or education and training systems, and so on.

The invention claimed is:

1. A stereoscopic video processing apparatus comprising:
   a switch operation detection unit configured to detect a switch operation made by a user, the switch operation being an operation to select a channel of a three-dimensional (3D) video or an operation for a fast-forward playback, a rewind playback, skipping, or locating a cue point of the 3D video;
   a frequency determination unit configured to determine a detection frequency indicating the number of switch operations per unit of time detected by the switch operation detection unit; and
   a processing unit configured to perform processing to reduce a difference in depth between 3D videos before and after switching of the 3D videos when the detection frequency per unit of time determined by the frequency determination unit is higher than or equal to a predetermined frequency.

2. The stereoscopic video processing apparatus according to claim 1,
   wherein the processing unit is configured to reduce the difference in depth by performing processing on video information of the 3D video.

3. The stereoscopic video processing apparatus according to claim 2,
   wherein the processing unit is configured to reduce the difference in depth by performing, on the video information of the 3D video, processing to reduce a disparity between a left-eye video and a right-eye video.

4. The stereoscopic video processing apparatus according to claim 1,
   wherein the processing unit is configured to present, to the user, one of a left-eye video and a right-eye video which are included in the 3D video.

5. The stereoscopic video processing apparatus according to claim 1,
   wherein the processing unit includes a shutter adjustment unit configured to place a right-eye shutter of a 3D video viewer worn by the user in an open state and a left-eye shutter of the 3D video viewer worn by the user in a closed state when a right-eye video included in the 3D video is presented, and place the right-eye shutter in the closed state and the left-eye shutter in the open state when a left-eye video included in the 3D video is presented, and
   the shutter adjustment unit is further configured to, when the detection frequency per unit of time determined by the frequency determination unit is higher than or equal to the predetermined frequency, (i) place the right-eye shutter and the left-eye shutter in the open state when the right-eye video is presented, and place the right-eye shutter and the left-eye shutter in the closed state when the left-eye video is presented, or (ii) place the right-eye shutter and the left-eye shutter in the open state when the left-eye video is presented, and place the right-eye shutter and the left-eye shutter in the closed state when the right-eye video is presented.

6. The stereoscopic video processing apparatus according to claim 1, further comprising
   a depth information accumulation unit configured to accumulate depth information of the 3D video,
   wherein the processing unit includes:
   a depth adjustment determination unit configured to determine, by referring to the depth information accumulated in the depth information accumulation unit, whether or not the difference in depth between the 3D videos before and after the switching of the 3D videos caused by the switch operation is larger than or equal to a predetermined difference, when the detection frequency per unit of time determined by the frequency determination unit is higher than or equal to the predetermined frequency; and a depth adjustment unit configured to perform the processing to reduce the difference in depth when the depth adjustment determination unit determines that the difference in depth is larger than or equal to the predetermined difference.

7. The stereoscopic video processing apparatus according to claim 6, wherein the depth information accumulation unit is configured to accumulate the depth information for each of display regions obtained by spatially dividing a display screen for the 3D video, the depth adjustment determination unit is configured to determine for each of the display regions, by referring to the depth information accumulated for each of the display regions in the depth information accumulation unit, whether or not the difference in depth between the 3D videos before and after the switching of the 3D videos caused by the switch operation is larger than or equal to the predetermined difference, when the detection frequency per unit of time determined by the frequency determination unit is higher than or equal to the predetermined frequency, and the depth adjustment unit is configured to perform the processing to reduce the difference in depth when the depth adjustment determination unit determines for any of the display regions that the difference in depth is larger than or equal to the predetermined difference.

8. The stereoscopic video processing apparatus according to claim 7, wherein the display screen for the 3D video is divided into the display regions by dividing a central part of the display screen more finely than a peripheral part of the display screen.

9. The stereoscopic video processing apparatus according to claim 6, wherein the depth information accumulation unit is configured to accumulate the depth information for a display region in a lower part of the display screen for the 3D video, the depth adjustment determination unit is configured to determine, by referring to the depth information accumulated for the display region in the lower part in the depth information accumulation unit, whether or not the difference in depth between the 3D videos before and after the switching of the 3D videos caused by the switch operation is larger than or equal to the predetermined difference, when the detection frequency per unit of time determined by the frequency determination unit is higher than or equal to the predetermined frequency, and the depth adjustment unit is configured to perform the processing to reduce the difference in depth when the depth adjustment determination unit determines for the display region in the lower part that the difference in depth is larger than or equal to the predetermined difference.

10. The stereoscopic video processing apparatus according to claim 6, wherein the depth information accumulation unit is configured to accumulate the depth information for each of objects included in the 3D video, the depth adjustment determination unit is configured to determine for each pair of the objects, by referring to the depth information accumulated for each of the objects in the depth information accumulation unit, whether or not the difference in depth between the 3D videos before and after the switching of the 3D videos caused by the switch operation is larger than or equal to the predetermined difference, when the detection frequency per unit of time determined by the frequency determination unit is higher than or equal to the predetermined frequency, and the depth adjustment unit is configured to perform the processing to reduce the difference in depth when the depth adjustment determination unit determines for any pair of the objects that the difference in depth is larger than or equal to the predetermined difference.

11. The stereoscopic video processing apparatus according to claim 6, wherein the processing unit further includes a channel selection predicting unit configured to predict a channel which will be selected in the future, from a history of the operation to select a channel of the 3D video detected by the switch operation detection unit, and the depth adjustment determination unit is configured to determine whether or not a difference in depth between the 3D video in a channel currently selected and the 3D video in the channel predicted by the channel selection predicting unit to be selected in the future is larger than or equal to the predetermined difference, when the detection frequency per unit of time determined by the frequency determination unit is higher than or equal to the predetermined frequency.

12. The stereoscopic video processing apparatus according to claim 11, wherein the channel selection predicting unit is configured to predict the channel which will be selected in the future to be a channel with a next large number following the channel currently selected, when the history of the operation to select a channel of the 3D video detected by the switch operation detection unit allows to determine that channels are selected in ascending order.

13. The stereoscopic video processing apparatus according to claim 11, wherein the channel selection predicting unit is configured to predict the channel which will be selected in the future to be a channel with a next small number following the channel currently selected, when the history of the operation to select a channel of the 3D video detected by the switch operation detection unit allows to determine that channels are selected in descending order.

14. The stereoscopic video processing apparatus according to claim 1, wherein the operation to select a channel of the 3D video detected by the switch operation detection unit is an operation to temporally switch the 3D videos and display the 3D videos in a same display region on a same display screen.

15. The stereoscopic video processing apparatus according to claim 1, further comprising an output unit configured to output information to the user, wherein the output unit is configured to output a warning to the user when the detection frequency per unit of time determined by the frequency determination unit is higher than or equal to the predetermined frequency.

16. The stereoscopic video processing apparatus according to claim 1, further comprising:

an output unit configured to output information to the user; and an operation receiving unit configured to acquire operation input entered by the user, wherein the output unit is configured to output information for asking the user whether or not the processing to reduce the difference in depth is to be performed, when the detection frequency per unit of time determined by the frequency determination unit is higher than or equal to the predetermined frequency.

17. The stereoscopic video processing apparatus according to claim 1, further comprising
an output unit configured to output information to a second user different from a first user who made the switch operation,
wherein the output unit is configured to output a warning to the second user when the detection frequency per unit of time determined by the frequency determination unit is higher than or equal to the predetermined frequency.

18. The stereoscopic video processing apparatus according to claim 17, further comprising
an operation receiving unit configured to acquire operation input entered by the second user,
wherein the output unit is configured to output, to the second user, the warning or information for asking whether or not the processing to reduce the difference in depth is to be performed, when the detection frequency per unit of time determined by the frequency determination unit is higher than or equal to the predetermined frequency,
the operation receiving unit is configured to acquire the operation input entered by the second user, and
the processing unit is configured to perform the processing to reduce the difference in depth according to the operation input entered by the second user and acquired by the operation receiving unit.

19. A stereoscopic video processing method comprising:
detecting a switch operation made by a user, the switch operation being an operation to select a channel of a three-dimensional (3D) video or an operation for a fast-forward playback, a rewind playback, skipping, or locating a cue point of the 3D video;
determining a detection frequency indicating the number of switch operations per unit of time detected in the detecting; and
performing processing to reduce a difference in depth between 3D videos before and after switching of the 3D videos when the detection frequency per unit of time determined in the determining is higher than or equal to a predetermined frequency.

20. A non-transitory computer-readable recording medium for use in a computer, the recording medium having a computer program recorded thereon for causing the computer to execute the stereoscopic video processing method according to claim 19.

* * * * *